United States Patent
Seo

(10) Patent No.: US 12,101,660 B2
(45) Date of Patent: Sep. 24, 2024

(54) COMMUNICATION MANAGEMENT SERVER, COMMUNICATION MANAGEMENT SYSTEM, COMMUNICATION MANAGEMENT METHOD

(71) Applicant: Yamaha Corporation, Hamamatsu (JP)

(72) Inventor: Tatsuya Seo, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 27 days.

(21) Appl. No.: 16/996,262

(22) Filed: Aug. 18, 2020

(65) Prior Publication Data
US 2021/0058821 A1 Feb. 25, 2021

(30) Foreign Application Priority Data
Aug. 19, 2019 (JP) ................. 2019-150015

(51) Int. Cl.
*H04W 28/02* (2009.01)
*H04L 12/46* (2006.01)
*H04W 4/20* (2018.01)

(52) U.S. Cl.
CPC ..... *H04W 28/0268* (2013.01); *H04L 12/4641* (2013.01); *H04W 4/203* (2013.01)

(58) Field of Classification Search
CPC ............. H04L 12/4625; H04L 12/4641; H04L 63/0272; H04L 63/102; H04L 67/141; H04W 28/0268; H04W 4/203
See application file for complete search history.

(56) References Cited

U.S. PATENT DOCUMENTS

| 6,009,097 A * | 12/1999 | Han | H04L 9/40 |
| | | | 370/466 |
| 2005/0163091 A1* | 7/2005 | Nakasaku | H04W 40/24 |
| | | | 370/338 |

(Continued)

FOREIGN PATENT DOCUMENTS

| JP | 2005-79740 A | 3/2005 |
| JP | 2011-53985 A | 3/2011 |
| JP | 2011-55305 A | 3/2011 |

OTHER PUBLICATIONS

English translation of Japanese-language Office Action issued in Japanese Application No. 2019-150015 dated Apr. 11, 2023 (six (6) pages).

(Continued)

*Primary Examiner* — Zhensheng Zhang
(74) *Attorney, Agent, or Firm* — Crowell & Moring LLP

(57) ABSTRACT

A communication management server includes a processor and a memory device configured to store a program. The program causes the processor to acquire first identification information configured to indicate a network service and second identification information configured to manage a communication device receiving the network service. The program also causes the processor to generate first setting information configured to connect a network providing server corresponding to the network service and the communication device based on the first identification information and the second identification information. The program also causes the processor to transmit the first setting information generated in the generation unit to the communication device.

17 Claims, 22 Drawing Sheets

(56) References Cited

U.S. PATENT DOCUMENTS

| | | | | |
|---|---|---|---|---|
| 2007/0078927 A1* | 4/2007 | Yang | .................. | H04L 67/51 |
| | | | | 709/203 |
| 2015/0171910 A1* | 6/2015 | Gao | .................. | H04L 63/0884 |
| | | | | 455/406 |
| 2018/0103149 A1* | 4/2018 | Skiba | .................. | H04L 51/02 |
| 2018/0278517 A1* | 9/2018 | Narayanan | .................. | H04L 45/748 |
| 2020/0177438 A1* | 6/2020 | Nandy | .................. | H04L 12/18 |

OTHER PUBLICATIONS

English translation of Japanese-language Office Action issued in Japanese Application No. 2019-150015 dated Sep. 12, 2023 with English translation (3 pages).

* cited by examiner

FIG. 5

| Administrator ID (2100a) | Router address (2100c) |
|---|---|
| Admin-1 | 192.168.1.x1 |
| | 192.168.1.x2 |
| | ... |
| | 192.168.1.xN |

FIG. 6

| Router address | Network service contents | Preset information |
|---|---|---|
| 192.168.1.x1 | VoIP | Set-1 |
| 192.168.1.x2 | Video distribution | Set-2 |
| ... | ... | ... |
| 192.168.1.xN | Document Creation | Set-N |

FIG. 12

| | | |
|---|---|---|
| 2000a | Network service ID | Service-2 |
| 2100a | Administrator ID | Admin-1 |
| 2000c | IP address of the network service providing server | 192.168.0.x1 |
| 2100c | IP address of the router | 192.168.1.x2 |
| 2100e | Bandwidth | 10Mbps |
| 2100f | Priority | Priority-2 |
| 2100g | Communication path | Route-001 |

FIG. 13
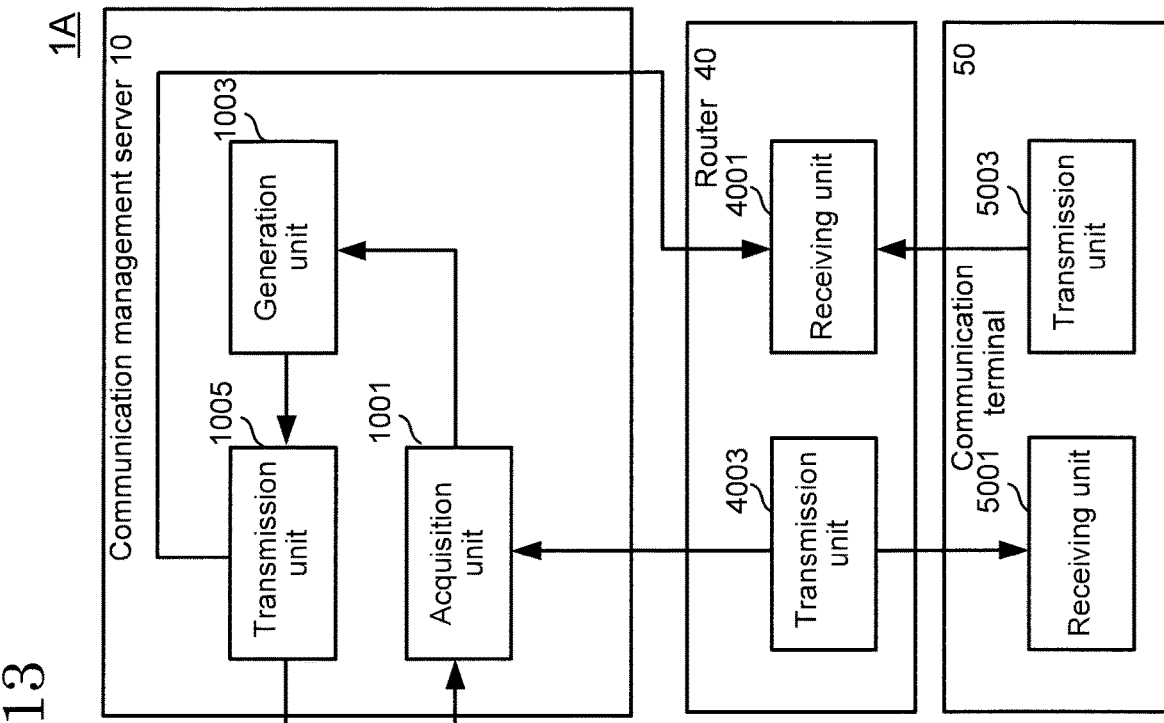
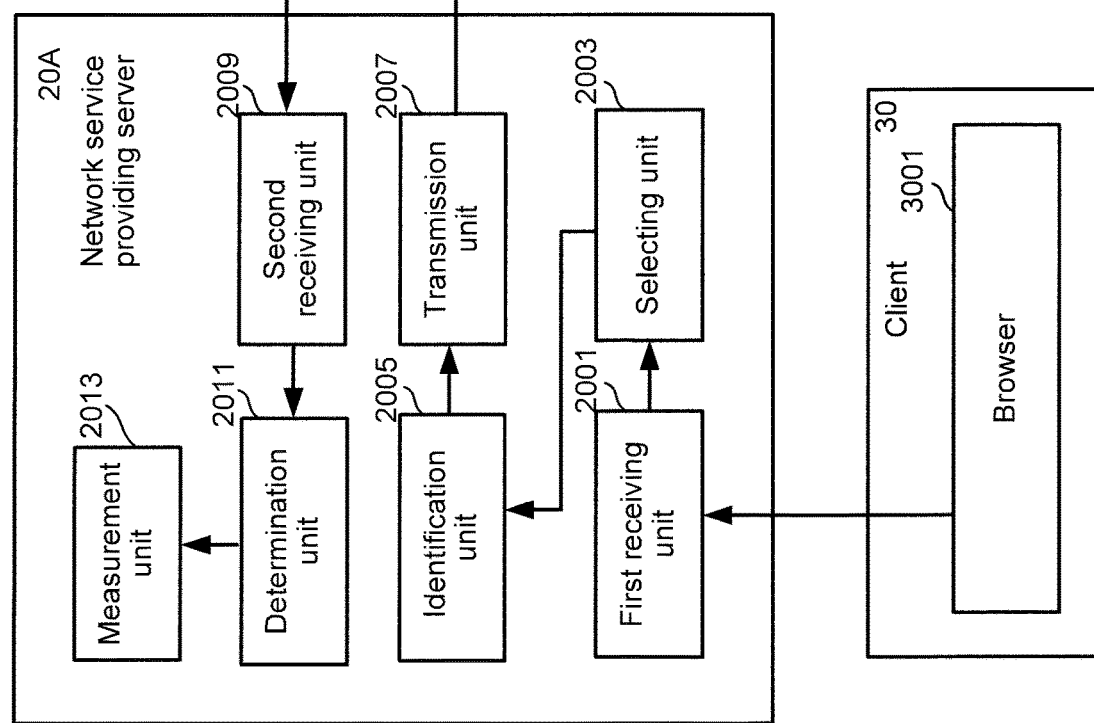

COMMUNICATION MANAGEMENT SERVER, COMMUNICATION MANAGEMENT SYSTEM, COMMUNICATION MANAGEMENT METHOD

This application is based upon and claims the benefit of priority from the prior Japanese Patent Application 2019-150015, filed on Aug. 19, 2019, and the entire contents of which are incorporated herein by reference.

FIELD

The present disclosure relates to a communication management server, a communication management system, and a communication management method.

BACKGROUND

Recently, VPN (Virtual Private Network) is used as a secure communication path between bases. By using VPN, information transmitted and received between bases can be encrypted to prevent information leakage.

SUMMARY

According to an embodiment of the present disclosure, a communication management server is provided. The communication management server includes a processor and a memory device configured to store a program. The program causes the processor to acquire first identification information configured to indicate a network service and second identification information configured to manage at least one communication device being supplied the network service. The program also causes the processor to generate first setting information configured to connect a network providing server corresponding to the network service and the at least one communication device based on the first identification information and the second identification information. The program also causes the processor to transmit the first setting information to the at least one communication device.

BRIEF DESCRIPTION OF THE DRAWINGS

FIG. 5 is a diagram showing an example of a router address associated with the administrator ID according to an embodiment of the present disclosure;

FIG. 6 is a diagram showing an example of preset information associated with the content of a router and a network service according to an embodiment of the present disclosure;

FIG. 12 is a diagram showing an example of setting information according to an embodiment of the present disclosure;

FIG. 13 is a functional block diagram of a communication management system according to an embodiment of the present disclosure;

DESCRIPTION OF EMBODIMENTS

Figure 1:
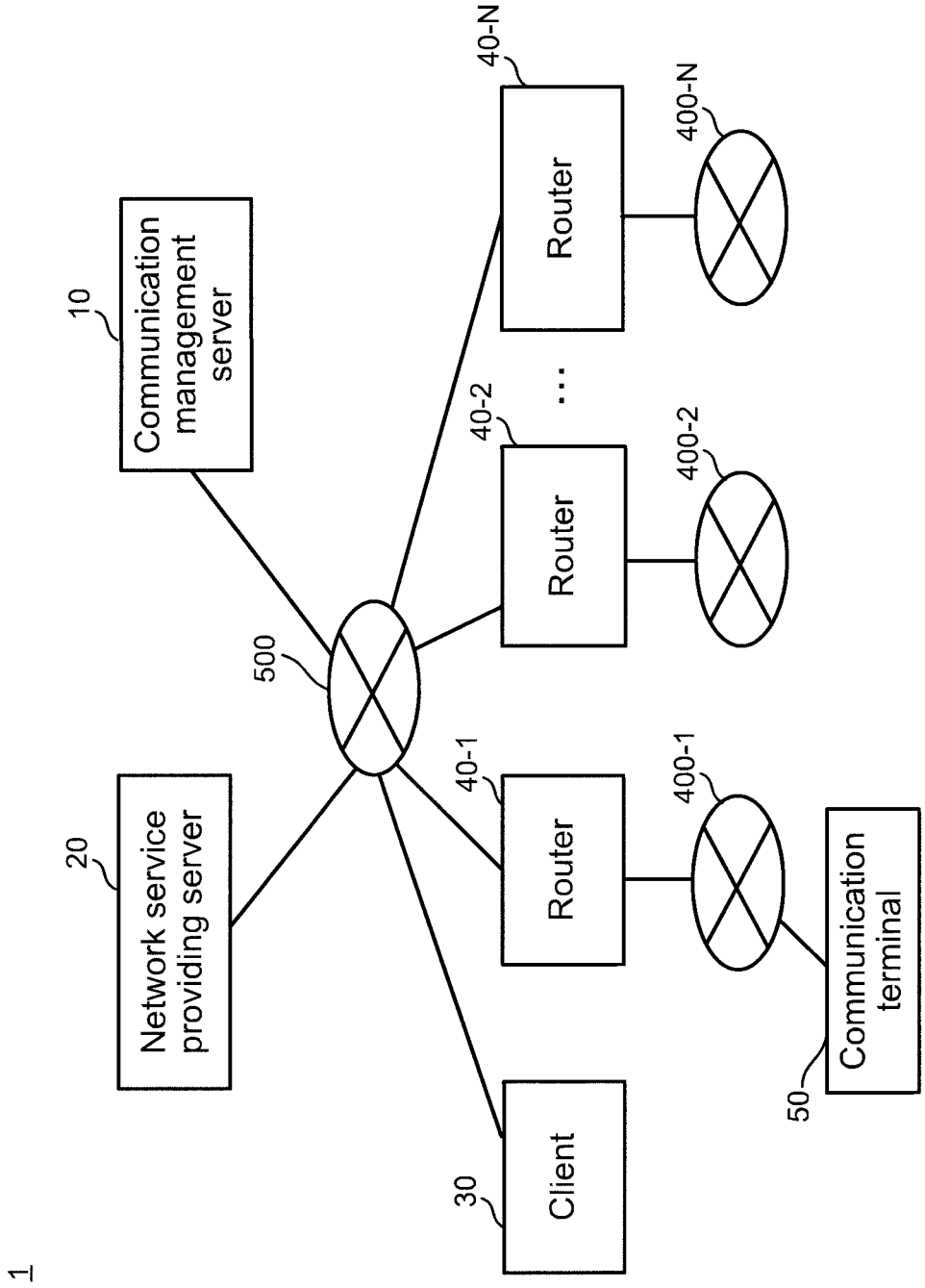
FIG. 1 is a block diagram showing an entire configuration of a communication management system according to an embodiment of the present disclosure.

Embodiments of the present disclosure will be described below with reference to the drawings and the like. However, the present disclosure can be implemented in many different modes and should not be construed as being limited to the description of the following embodiments. The drawings may be represented schematically for clarity of illustration, but are by way of an example, and are not intended to limit the interpretation of the disclosure. The letters "first" and "second" to each element are convenient labels used to distinguish each element and have no further meaning unless otherwise stated. In the drawings referred to in the present embodiment, the same portions or portions having similar functions are denoted by the same reference numerals or similar reference numerals (only A and B are denoted by the numerals xxx), and a repetitive description thereof may be omitted. In addition, units of the configuration may be omitted from the drawings. Otherwise, no specific explanation must be given if it can be recognized by a person ordinarily skilled in the art to which the disclosure pertains.

When a network service is provided from a server that provides network service (also called a network service providing server), communication path for connecting the bases to the network needs to be set individually as the number of bases increases. Therefore, it is complicated. In addition, there are various information that is transmitted and received via the network depending on different types of network services.

Considering these problems, an embodiment of the present disclosure provides a communication management server that easily provides network service to a communication device that receives the network service from the network service providing server.

Referring to the drawings, a communication management system according to an embodiment of the present disclosure will be described in detail.

<1-1. Configuration of Communication Management System>

FIG. 1 is a block diagram showing a configuration of a communication management system 1. As shown in FIG. 1, the communication management system 1 includes a communication management server 10, a network service providing server 20, a client 30, a plurality of routers 40-1, 40-2, . . . , 40-N (N is a natural number), and a communication terminal 50.

In the communication management system 1, the communication management server 10 is a server that controls a connection between the network service providing server and the router 40 via a second network 500. The network service providing server 20 is a server that provides the network service to the router 40 in response to requests from the client 30. The client 30 is a computer device used by an administrator who is managing the router to communicate with the network service providing server 20 wishing to provide networking services via the second network 500. The router 40 is a communication device wired or wirelessly connected to each of a first network 400-1, 400-2, . . . , 400-N and the second network 500. Each of a plurality of routers 40-1, 40-2, . . . , 40-N communicates with the second network 500. In the present embodiment, when each of the first network 400-1, 400-2, . . . , 400-N is not distinguished, these are collectively referred to as "the first network 400". When a plurality of routers 40-1, 40-2, . . . , 40-N are not distinguished, they are collectively referred to as "the router 40." The communication terminal 50 is a computer device that communicates with the network service providing server 20 which the communication terminal 50 wishes to provide the network service via the first network 400.

In the communication management system 1, the first network 400 is a network built within an organization, such as a company or a school. The first network 400 is, for example, an intranet that is an example of a closed area network. The intranet is, for example, LAN (Local Area Network).

The second network 500 in the communication management system 1 is a network built in a geographically wider area than the first network 400. The second network 500 may be, for example, the Internet or a WAN (Wide Area Network). The second network 500 is wired or wirelessly connected to the client 30 in addition to the communication management server 10, the network service providing server 20, and at least one router (in this instance, routers 40-1, 40-2, . . . , 40-N).

<1-1-1. Communication Management Server 10>

Figure 2:
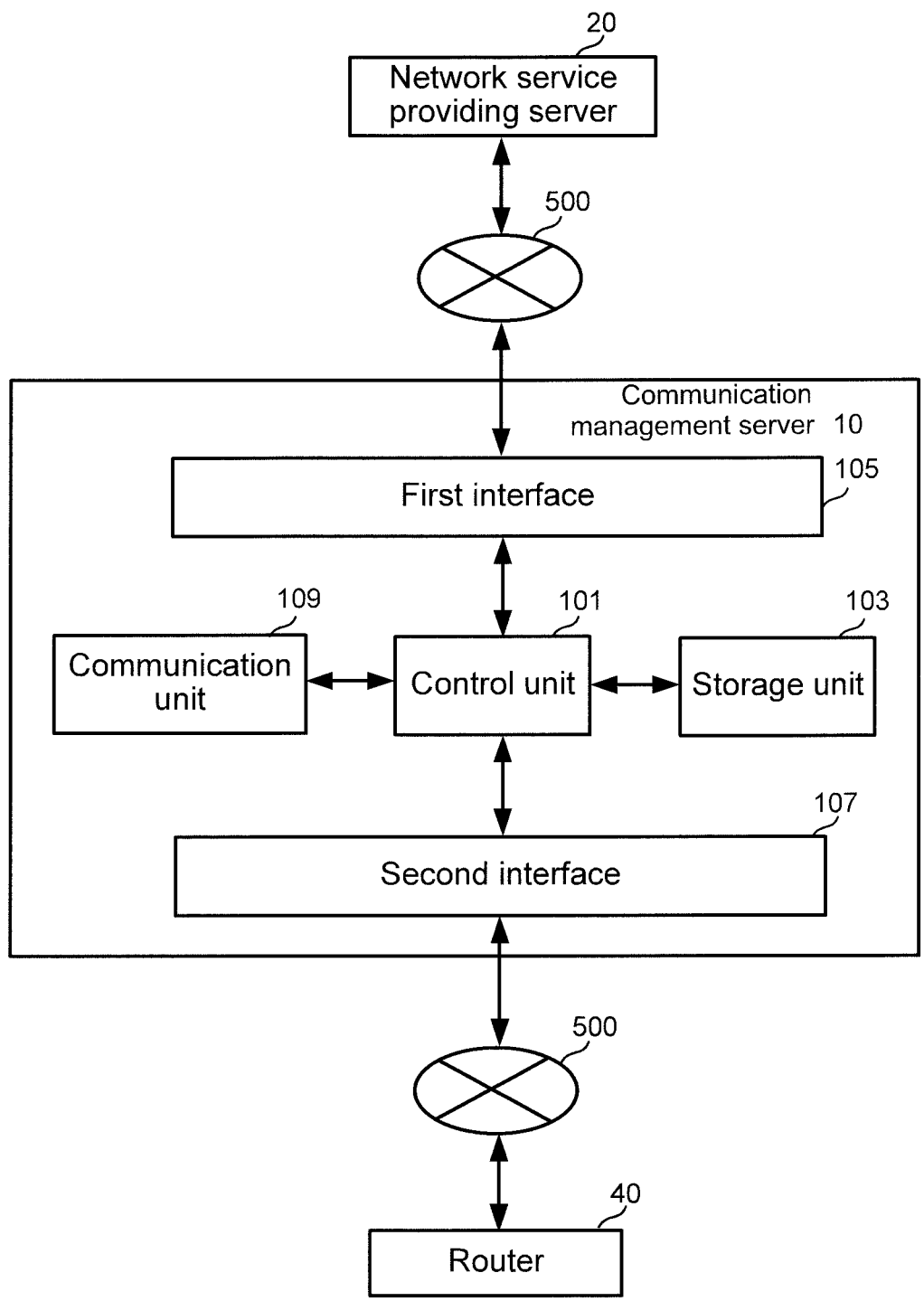
FIG. 2 is a block diagram showing a configuration of a communication management server according to an embodiment of the present disclosure.

FIG. 2 is a configuration diagram of a hardware of the communication management server 10. As shown in FIG. 2, the communication management server 10 includes a control unit 101, a storage unit 103, a first interface 105, a second interface 107, and a communication unit 109.

The control unit 101 includes a CPU (Central Processing Unit), an ASIC (Application Specific Integrated Circuit), a FPGA (Field Programmable Gate Array), or other arithmetic processing circuit. The control unit 101 controls the functions of the respective units of the communication management server.

As the storage unit 103, in addition to a memory, a SSD (Solid State Drive) semiconductor memory, or the like, a magnetic recording medium (magnetic tapes, magnetic disks, or the like), an optical recording medium, a magneto-optical recording medium, or a storage medium, which is a storable element, is used. The storage unit 103 has functions as the communication management control program and a data base for storing various information used by the communication management control program.

Figure 3:
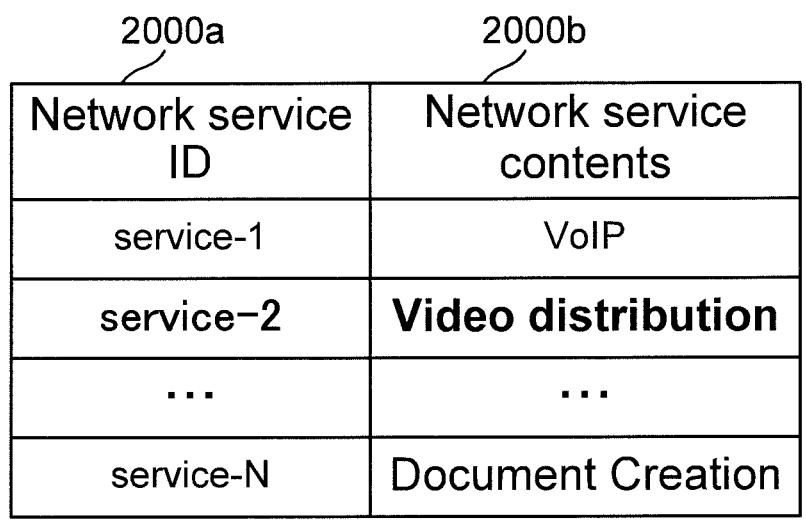
FIG. 3 is a diagram showing an example of a data structure of a network service ID and contents of a network service according to an embodiment of the present disclosure.

FIG. 3 is an example of a data structure of a network service ID 2000a (also referred to as first identification information) which indicates the network service stored in the storage unit 103 and network service contents 2000b. In the present embodiment, the network service provided by the network service providing server 20 includes various services such as a mail service, a telephone (VoIP: Voice over Internet Protocol) service, a video distribution service, an application service for document creation, and a remittance service between accounts (Internet banking).

Figure 4:
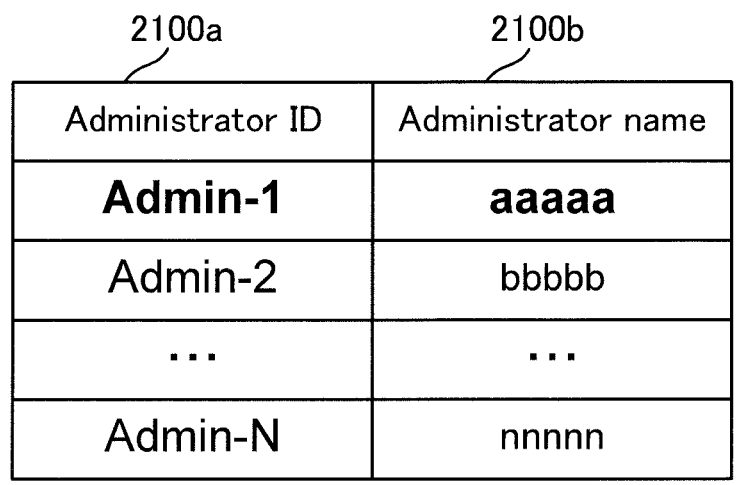
FIG. 4 is a diagram showing an example of an administrator ID and a data structure of administrator name according to an embodiment of the present disclosure.

FIG. 4 is an example of a data structure of an administrator ID 2100a (also referred to as second identification information) and an administrator name 2100b, which are stored in the storage unit 103. In this instance, the administrator ID 2100a is an identifier that is common to the plurality of routers 40. The administrator ID 2100a is an identifier corresponding to an administrator managing the communication device including the communication terminal 50, in addition to the router 40. FIG. 5 shows an example of a data structure of the administrator ID 2100a and an IP address 2100c of the router 40 corresponding to the administrator ID 2100a, which are stored in the storage unit 103. As shown in FIGS. 4 and 5, when the administrator ID is identified, the router 40 used for the communication can be specified.

The storage unit 103 can store preset information according to types of the router 40 and the contents of the network service. FIG. 6 is an example showing a data structure of preset information for generating setting information for network connection between the router 40 and the network service providing server 20. The data structure of FIG. 6 includes an IP address 2100c of the router, a network service contents 2000b, and preset information 2100d. In the present embodiment, the setting information refers to configuration data for communication between the network service providing server 20 and the router 40. As shown in FIG. 6, the preset information 2100d is appropriately changed in accordance with the network service contents 2000b and the type of the router used for the communication (e.g., the IP address 2100c of the router). The preset information includes at least one bandwidth (data transfer rate), priority (QoS: Quality of Service), and communication path, in addition to the IP address of the connected network service providing server 20 and the IP address of the router 40.

The description returns to FIG. 2. The first interface 105 is an interface for communicating with the network service providing server 20 via the second network 500, as described later. The second interface 107 is an interface for communicating with the router 40 via the second network 500. For example, the first interface 105 and the second interface 107 include, a modem or NIC (Network Interface Card). The control unit 101 transmits and receives data using the first interface 105 and the second interface 107.

The communication unit 109 connects to the second network 500 under the control of the control unit 101 and transmits and receives information between the external devices (the network service providing server 20 and the router 40).

<1-1-2. Network Service Providing Server 20>

Figure 7:
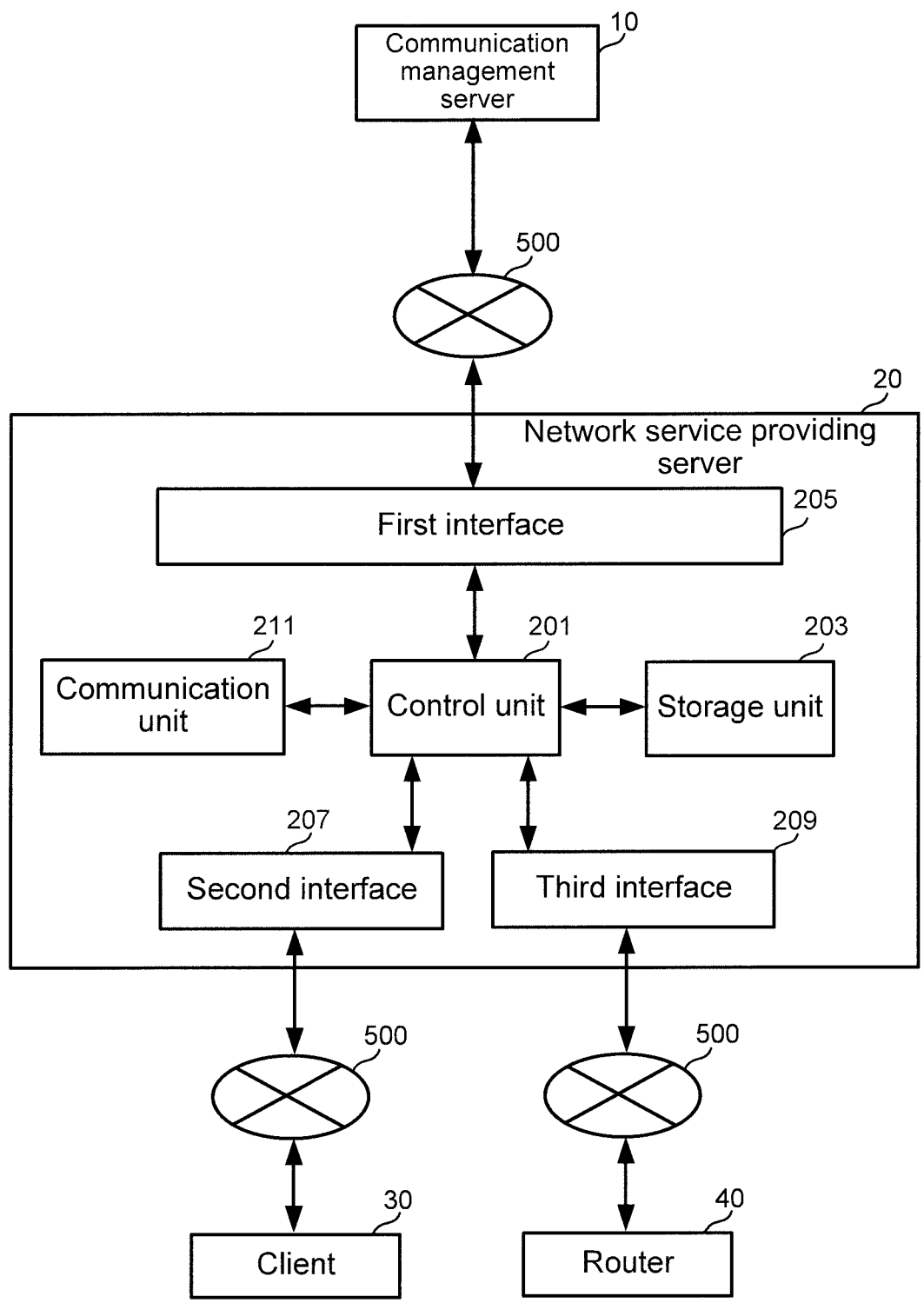
FIG. 7 is a block diagram showing a configuration of the network service providing server according to an embodiment of the present disclosure.

FIG. 7 is a block diagram showing an exemplary configuration of a hardware of the network service providing server 20. As shown in FIG. 7, the network service providing server 20 includes a control unit 201, a storage unit 203, a first interface 205, a second interface 207, a third interface 209, and a communication unit 211.

The control unit 201 controls the components of the network service providing server 20. The storage unit 203 stores a portion of the data used in a communication control program. Specifically, the storage unit 203 includes the network service ID 2000*a* shown in FIGS. 3 and 4, informational of various network services based on the network service contents 2000*b*, the administrator ID 2100*a*, and the administrator name 2100*b* as well as the communication management server 10.

The first interface 205 is an interface for communicating with the communication management server 10 via the second network 500. The second interface 207 is an interface for communicating with the client 30 via the second network 500. The third interface 209 is an interface for communicating with the router 40 via the second network 500. The communication unit 211 is connected to the second network 500 under the control of the control unit 201 and transmits and receives data between external devices (the communication management server 10, the client 30, and the router 40). For each of the control unit 201, the storage unit 203, and the first interface 205, the second interface 207, and the third interface 209, devices similar to those of the communication management server 10 can be used.

<1-1-3. Client 30>

Figure 8:
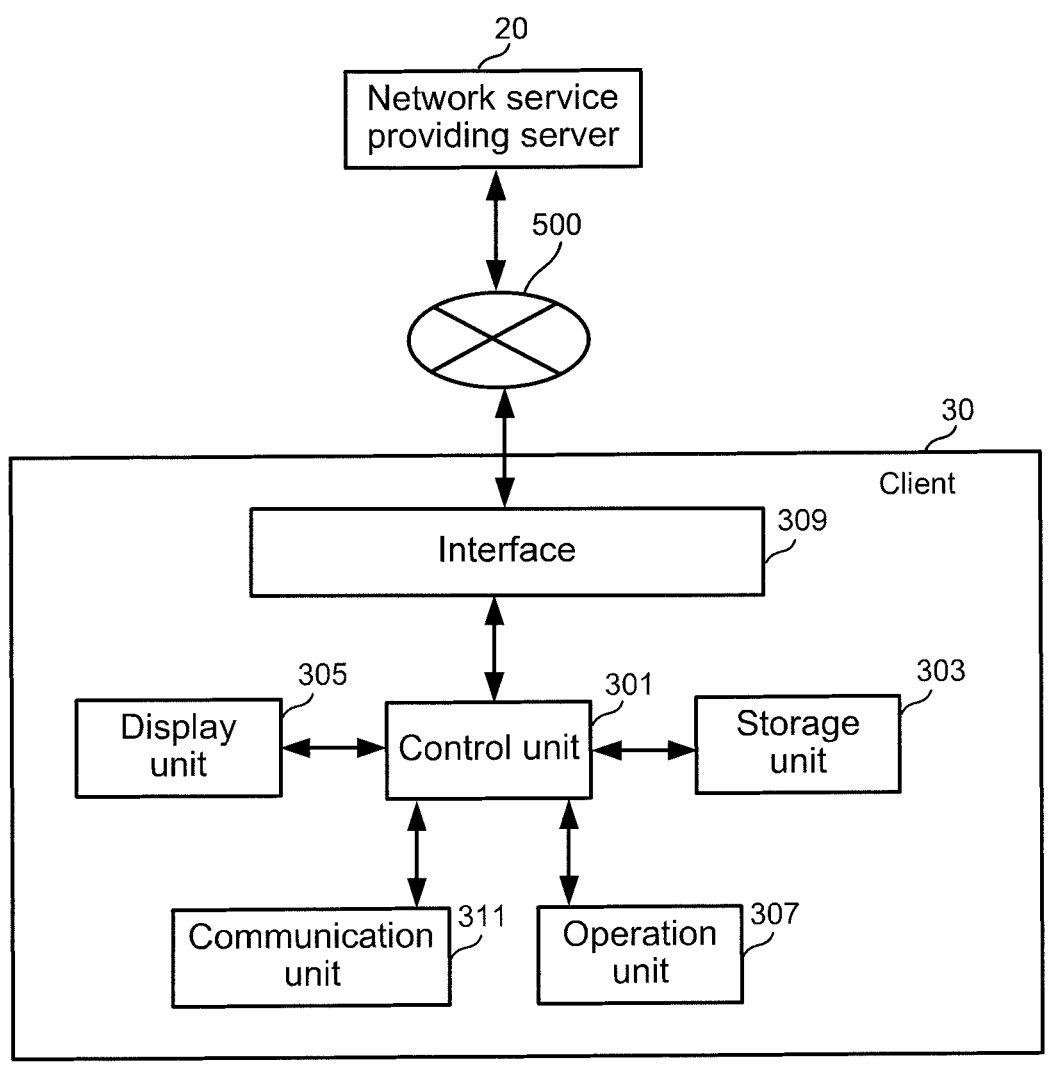
FIG. 8 is a block diagram showing a configuration of a client according to an embodiment of the present disclosure.

FIG. 8 is a block diagram showing an exemplary configuration of the client hardware. As shown in FIG. 8, the client 30 includes a control unit 301, a storage unit 303, a display unit 305, an operation unit 307, an interface 309, and a communication unit 311. In this example, a PC (personal computer) is employed as the client 30. The client 30 may be a cellular phone (a feature phone), a smartphone, a tablet-type terminal, an IoT device (a device having a power supply mechanism, a communication function, and an information storage mechanism), or the like, not limited to the personal computer. The device is applicable as long as the devices can communicate with the network service providing server 20 via networks.

The control unit 301 controls each unit of the client 30. The storage unit 303 has a function of storing a portion of the information related to the communication control program. The interface 309 is an interface for communicating with the network service providing server 20 via the second network 500. The communication unit 311 connects to the second network 500 under the control of the control unit 301 and transmits and receives information between the external device (the network service providing server 20). For the control unit 301, the storage unit 303, the interface 309, and the communication unit 311, the similar device to the communication management server 10 can be used.

The display unit 305 is a display device such as a liquid crystal display or an organic electroluminescent display. In the display unit 305, the displayed content of the user interface of the network service providing server is controlled by signals input from the control unit 301.

The operation unit 307 includes a keyboard, a controller, a button, or a switch. In the present embodiment, since the client 30 is a display device (touch panel) having a touch sensor, the display unit 305 and the operation unit 307 may be arranged at the same location. A signal input by operating the operation unit 307 is transmitted to the network service providing server 20.

<1-1-4. Router 40 and Communication Terminal 50>

Figure 9:
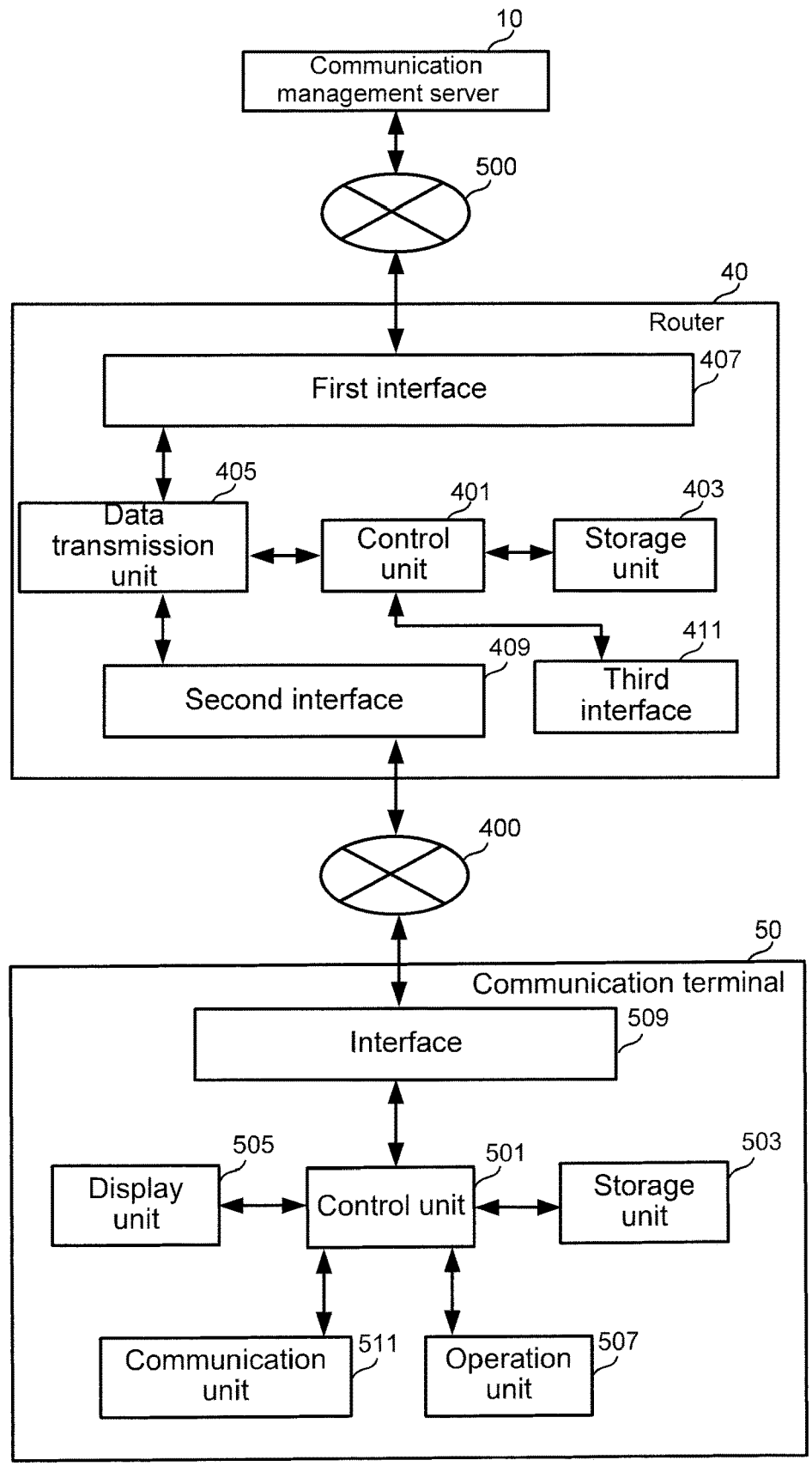
FIG. 9 is a block diagram showing a configuration of a router and a communication terminal according to an embodiment of the present disclosure.

FIG. 9 is a block diagram showing an exemplary configuration of a hardware of the router 40 and the communication terminal 50. The router 40 has a control unit 401, a storage unit 403, a data transmission unit 405, a first interface 407, a second interface 409, and a third interface 411.

The control unit 401 controls each unit of the router 40. The storage unit 403 stores the data of the communication terminal 50 connected to the router 40. The first interface 407 is an interface for communicating with the communication management server 10 via the second network 500. The communication path between the first interface 407 and the second network 500 may go via firewalls. The second interface 409 is an interface for communicating with the communication terminal 50 via the first network 400. That is, the router 40 can be said to be a relay device (also referred to as a first relay device) that relays the first network 400 and the second network 500. For the control unit 401, the storage unit 403, the first interface 407, and the second interface 409, the similar device to those of the communication management server 10.

The data transmission unit 405 transfers data between the first network 400 and the second network 500. The data transfer function corresponds to TCP (Transmission Control Protocol)/IP (Internet Protocol) protocols. The data transfer function may include a routing function that performs appropriate routing.

The router 40 includes GUI (Graphical User Interface) as the third interface 411. Information of the communication terminal 50 connected to the router 40 is output to an externally located electronic information device (ex. personal computer) connected via the GUI. For example, the GUI includes information about a terminal device connected to the router 40 (e.g., device name, manufacturer name, OS (Operating System), IP address or comments), and information about topology of the router 40 (e.g., the form of the terminal device connections).

As shown in FIG. 9, the communication terminal 50 includes a control unit 501, a storage unit 503, a display unit 505, an operation unit 507, an interface 509, and a communication unit 511. In the present embodiment, a personal computer is used as the communication terminal 50.

The control unit 501 controls each unit of the communication terminal 50. The storage unit 503 has a function of storing a portion of the information related to the communication control program. The interface 509 is an interface for communicating with the router 40 via the first network 400. The communication unit 511 is connected to the first network 400 under the control of the control unit 501. The communication unit 511 transmits and receives data between an external device (the router 40). For the control unit 501, the storage unit 503, the interface 509, and the communication unit 511, the device similar to those of the communication management server 10 can be used.

The display unit 505 is a display device, and the displayed content in the displayed unit 505 is controlled by a signal input from the control unit 501. The operation unit 507 operates the content of the network service provided to the communication terminal 50.

<1-2. Functional Block Diagram of the Communication Management System>

Figure 10:
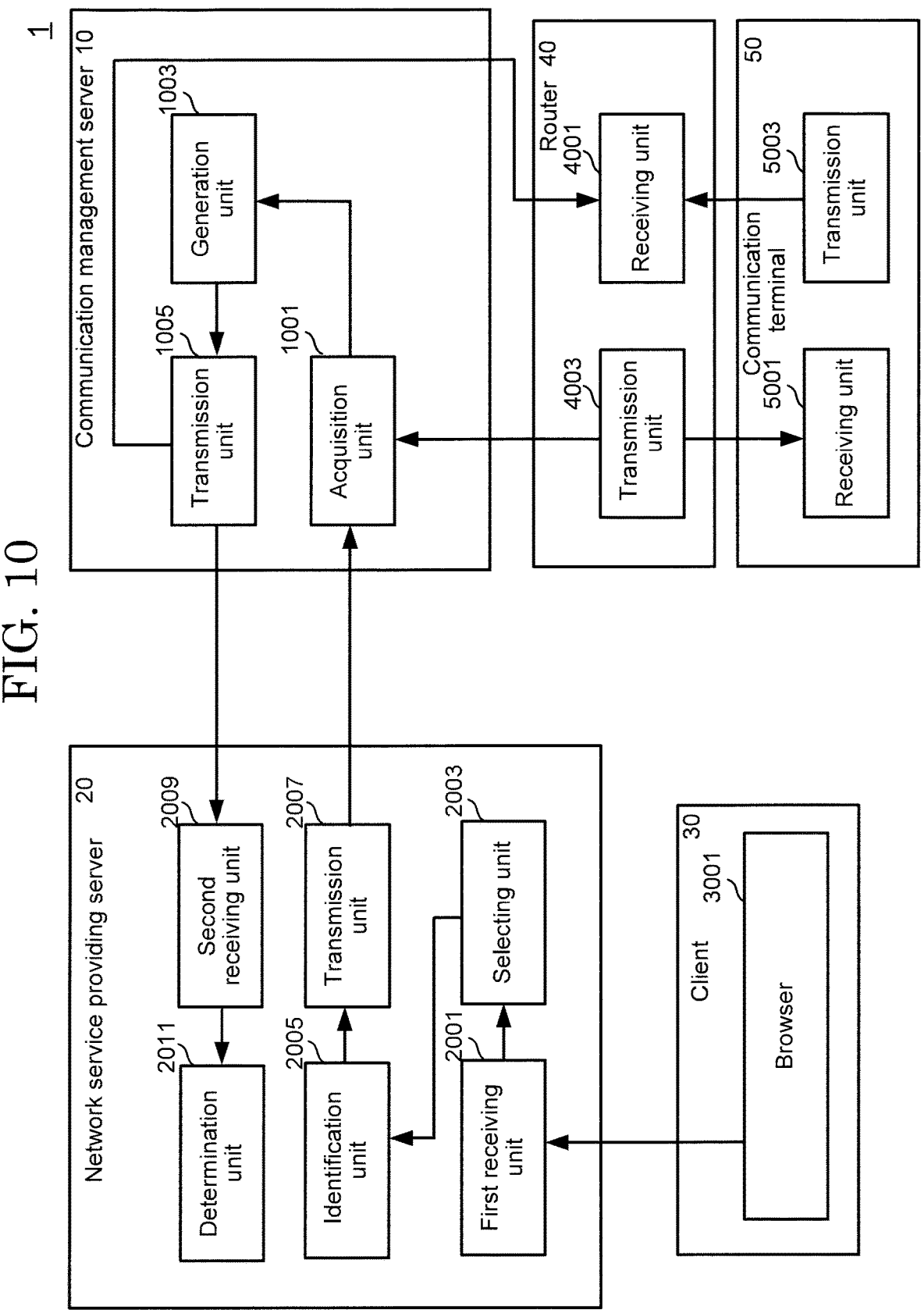
FIG. 10 is a functional block diagram of a communication management system according to an embodiment of the present disclosure.

FIG. 10 is a block diagram showing an exemplary functional configuration of the communication management system 1. Each of functions described below may be implemented in hardware, software, or a combination of hardware and software.

In FIG. 10, the network service providing server 20 has a first receiving unit 2001, a selecting unit 2003, an identification unit 2005, a transmission unit 2007, a second receiving unit 2009, and a determination unit 2011.

The first receiving unit 2001 receives information of the network service input from the client 30 on a browser 3001. The selecting unit 2003 selects the network service to be provided to the router 40, based on a signal from the client 30. The identification unit 2005 identifies the administrator ID 2100a of the administrator who has inputted a selection signal of the network service. The transmission unit 2007 (also known as a first transmission unit) transmits the network service ID 2000a (the first identification Information) indicating the selected network service and the administrator ID 2100a (the second identification Information) of the administrator managing the router 40 receiving the network service to the communication management server 10.

The second receiving unit 2009 receives the setting information to connect the network service providing server 20 and the router 40. The setting information is transmitted from the communication management server 10. The determination unit 2011 determines whether to allow connecting to the router 40 based on the setting information.

In FIG. 10, the communication management server 10 includes an acquisition unit 1001, a generation unit 1003, and a transmission unit 1005.

The acquisition unit 1001 acquires the network service ID 2000a and the administrator ID 2100a which are transmitted from the network service providing server 20. The generation unit 1003 generates the setting information to determine the communication condition between the network service providing server 20 and the router 40 corresponding to the administrator. The setting information is determined based on the network service ID 2000a and the router information associated with the administrator ID 2100a. When generating the setting information, the storage unit 103 in the communication management server 10 can use the preset information described above as a connection setting between the network service providing server 20 and the router 40. The transmission unit 1005 transmits the setting information to connect the network service providing server 20 and the router 40 to both the network service providing server 20 and the router 40.

In FIG. 10, the router 40 includes a receiving unit 4001 and a transmission unit 4003.

The receiving unit 4001 receives the setting information transmitted from the transmission unit 1005 of the communication management server 10, and receives information (e.g., an identification information of a communication terminal) required for the setting information from the communication terminal 50. The transmission unit 4003 transmits the information of the communication terminal 50 connected to the router 40 to the acquisition unit of the communication management server 10. The transmission unit 4003 transmits all or unit of the setting information to the communication terminal 50.

The communication terminal 50 includes a receiving unit 5001 and a transmission unit 5003.

The receiving unit 5001 receives all or part of the setting information transmitted from the router 40. The transmission unit 5003 transmits the identification information of the communication terminal 50 to the acquisition unit 1001 of the communication management server 10. In other words, the communication management server 10 can set the communication terminal 50.

<1-3. Communication Management Control Processing>

Next, a communication management control processing based on an instruction by the communication management program in a control unit 100 will be described with reference to FIG. 11.

Figure 11:
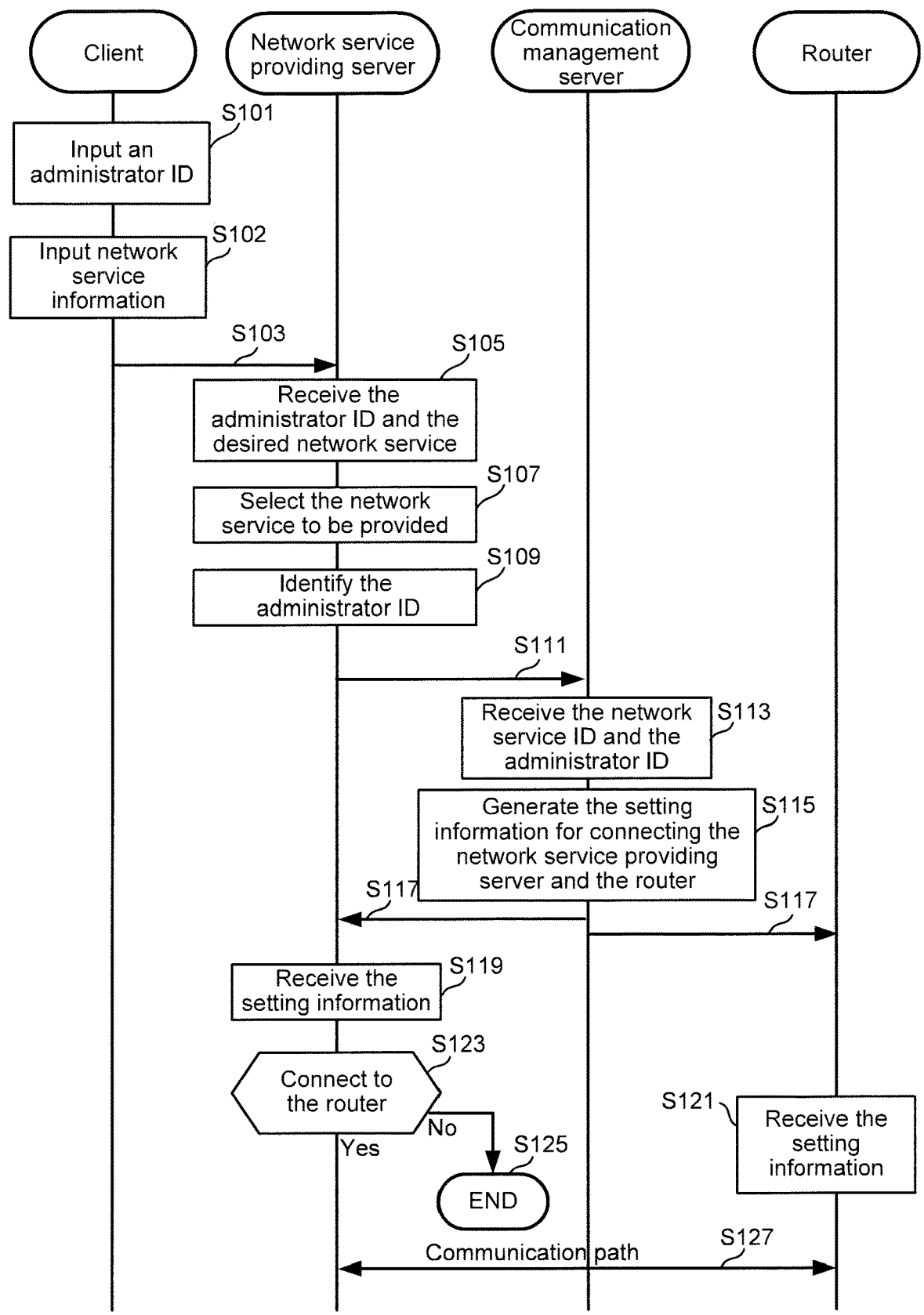
FIG. 11 is a flow diagram showing an example of a process flow performed by a communication management system according to an embodiment of the present disclosure.

In FIG. 11, first, communication between the client 30 and the network service providing server 20 is performed. In this case, the administrator logs in to the network service providing server 20 on the web browser 3001 displayed in the display unit 305 of the client 30 (S101). The administrator ID 2100a is input when the administrator logs in to the network service providing server 20. The administrator ID 2100a is received by the first receiving unit 2001 of the network service providing server 20 and stored by the storage unit 203. After the administrator has logged in to the network service providing server 20, the administrator selects the network service which the administrator wishes to receive from the network service providing server 20 in the user interface on the web browser 3001. The administrator inputs the relevant network service information and the information of the router 40 to be the target of the network service (S102). More specifically, the administrator selects the network service name to be provided (input the selection signal) in the displayed user interface. In addition, the administrator clicks a start button icon. The client 30 transmits the entered information to the network service providing server 20 (S103).

The first receiving unit 2001 of the network service providing server 20 receives the administrator ID 2100a and the network service desired by the administrator, which are transmitted from the client 30 (S105). The selecting unit 2003 of the network service providing server 20 selects the network service to be provided to the router 40 based on the received network service information (S107).

The selecting unit 2003 selects the network service ID 2000a from the input network services data. In this case, if the video distribution network service is selected, service-2 is selected as the network service ID 2000a. The selecting unit 2003 may select a plurality of network services ID 2000a if the administrator wants a plurality of network services. The identification unit 2005 of the network service providing server 20 identifies the administrator ID 2100a (S109). The identification unit 2005 can identify the administrator from the database if the administrator ID 2100a of the administrator is registered on the database of the network service providing server 20, as shown in FIG. 4.

The transmission unit 2007 of the network service providing server 20 then transmits the network service ID 2000a (the first identification information) of the selected network service and the administrator ID 2100*a* (the second identification information) to the communication management server 10 (S111).

Next, the acquisition unit 1001 on the communication management server 10 receives the network service ID 2000*a* and the administrator ID 2100*a* of the administrator of the router 40 provided with the network service, which are transmitted from the network service providing server 20 (S113).

The generation unit 1003 generates the setting information for connecting the network service providing server 20 and the router 40, based on the network service ID 2000*a* of the network service information and the administrator ID 2100*a* which are acquired by the acquisition unit 1001 (S115).

The acquisition unit 1001 acquires the IP address of the router 40 selected from the router 40 corresponding to the administrator ID 2100*a* shown in FIG. 5 from the storage unit 103, based on the acquired administrator ID 2100*a*. The generation unit 1003 may generate the setting information based on the IP address of the selected router 40 and the administrator ID 2100*a*. In this case, the acquisition unit 1001 may acquire the communication condition of the corresponding router 40 from the transmission unit 4003 of the router 40. The generation unit 1003 may select the router 40 to be connected according to the content of the network services among the router 40 associated with the administrator ID 2100*a*. The generation unit 1003 may then generate the setting information based on the preset information shown in FIG. 6, which is used to connect the network service providing server 20 and the router 40. As a result, the generation unit 1003 can generate the setting information according to the type of the network service.

For example, if the generation unit 1003 generates the setting information, in the case of a video distribution network service, information to extend the bandwidth may be generated as the setting information (to improve the data transfer rate). In the case of Telephone Network Services (VoIP: Voice over Internet Protocol), the generation unit 1003 may generate information to increase priority of the communication. In the case of document creation application network service using the Internet, the generation unit 1003 may generate information for newly installing communication path.

The generated setting information is transmitted from the transmission unit 1005 to the network service providing server 20 and the corresponding router 40 (S117). FIG. 12 is an example of the generated setting information. The setting information includes the network service ID 2000*a*, the administrator ID 2100*a*, an IP address 2000*c* of the network service providing server 20, the IP address 2100*c* of the router 40, bandwidth 2100*e*, priority 2100*f*, and communication path 2100*g*. In the example shown in FIG. 12, if video distribution network services are provided from the network service providing server 20 (IP address: 192.168.0.x1) to the router 40 (IP address: 192.168.1.x2), the setting information is set to bandwidth: 10 Mbps, priority: Priority-2, communication path: Route-001. The setting information to be transmitted to the network service providing server 20 and the router 40 may be partially or entirely as necessary.

When the network service providing server 20 and the router 40 receive the setting information (S119, S121), the determination unit 2011 of the network service providing server 20 determines whether to allow connecting to the router 40 (S123). At this time, the determination unit 2011 determines whether to allow connecting based on a predetermined condition for starting the provision of network service. For example, the determination unit 2011 may determine whether the connected router 40 corresponds to the information of the router 40 previously entered by the administrator, whether payment for the network service has been made in advance, or whether the setting condition is within the communication range. The determination unit 2011 may determine whether a network service provision contract has been made, whether it is the network service provision time, or whether the network service providing server 20 is in a state in which the network service can be provided. When the determination unit 2011 determined that the connection between the network service providing server 20 and the router 40 (S123; No) is not allowed, the communication management control processing is terminated (S125). If the determination unit 2011 determined that the connection between the network service providing server 20 and the router 40 is possible (S123; Yes), the network service providing server 20 and the router 40 are connected based on the setting condition (S127). At this time, the network service providing server 20 may make VPN connection with the router 40. As a result, a safer communication network is formed. Thus, the communication terminal 50 connected to the router 40 can receive the networking services.

Compared with the prior art and the present embodiment, in the prior art, when connecting the network service providing server 20 and the router 40 corresponding to the administrator who is provided the network services, it is complicated because the setting condition need to be set individually. Since there are also various information of the network service to be transmitted and received, unless the optimum setting conditions are set according to the network service to be offered, it may be not possible to receive the provision of the network service stably (for example, communication speed may be slow). However, by using the present embodiment, the optimum configuration information for connecting the network service providing server 20 and the router 40 can be generated more easily and quickly simply by inputting information for the administrator to start receiving the network service. Thus, the network service providing server 20 and the router 40 are connected using the optimum communication conditions for the provided network services.

Previously, an example that the connection between the network service providing server 20 and the router 40 continues from the beginning of the connection is shown but not limited thereto. Here, a communication management system differing from the above will be described. Specifically, an example that the network service providing server 20 includes a measuring unit that measures a period of time during which the network service providing server 20 and the router 40 are connected is described.

FIG. 13 is a functional block diagram of a communication management system 1A. As shown in FIG. 13, a network service providing server 20A includes a measurement unit 2013 in addition to the first receiving unit 2001, the selecting unit 2003, the identification unit 2005, the transmission unit 2007, the second receiving unit 2009 and the determination unit 2011. The measurement unit 2013 measures a period of time corresponding to connection between the network service providing server 20 and the router 40.

Figure 14:
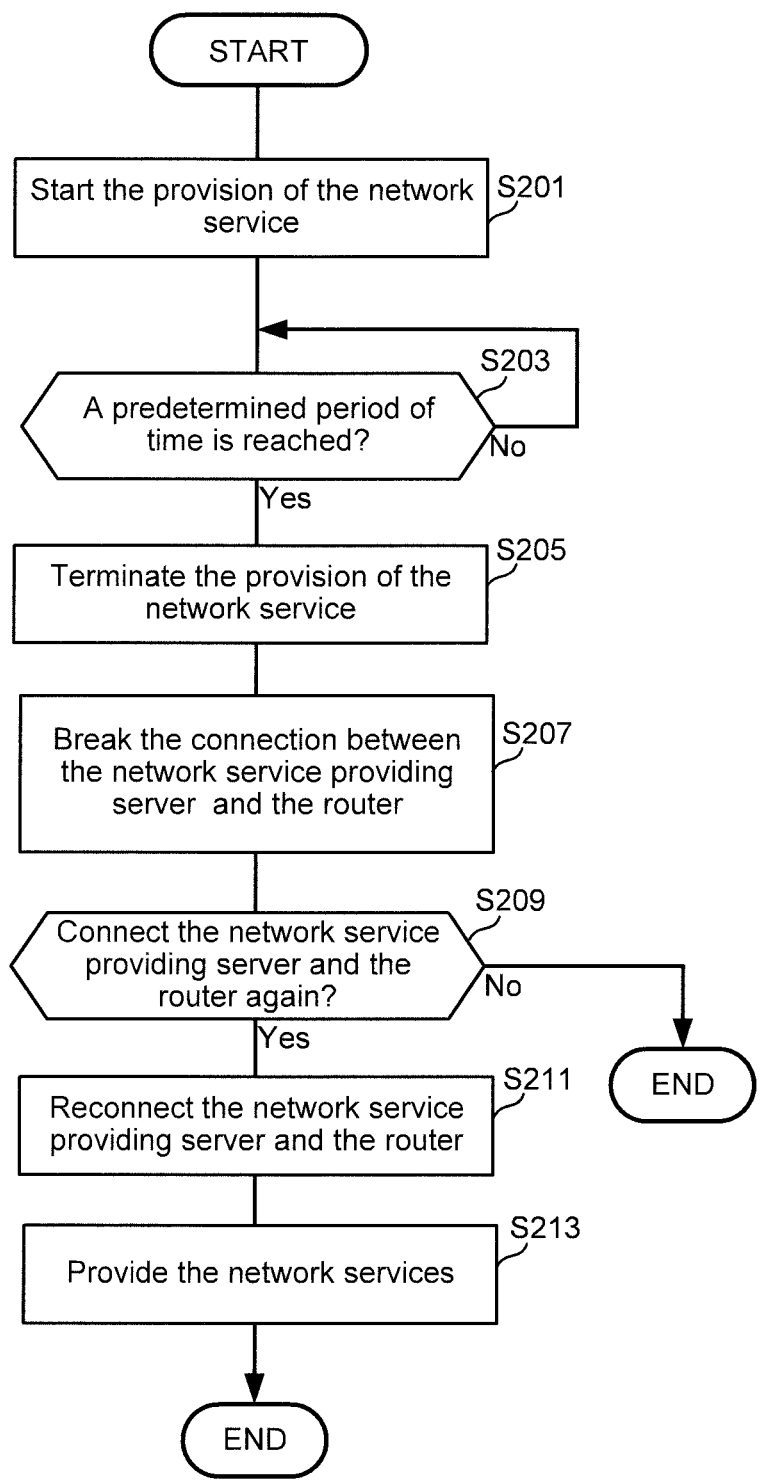
FIG. 14 is a flow diagram showing an example of a process flow performed by a communication management system according to an embodiment of the present disclosure.

FIG. 14 is a flow diagram of a communication management control processing of the network service providing server 20A. As shown in FIG. 14, the connection between the network service providing server 20 and the router 40 is completed and the provision of the network service is started (S201). After that, the measurement unit 2013 of the network service providing server 20A measures the connection period of time until a predetermined period of time is reached (S203). The connection period of time may be a period of time from the beginning of the connection, or a period of time that is actually provided by the network service. Until the connection time reaches a predetermined time (S203; No), the connection between the network service providing server 20 and the router 40 is maintained, and the communication terminal 50 connected to the router 40 can receive the network services. If the connection period of time reaches the predetermined period of time (S203; Yes), the provision of the network service terminates (S205) and the connection between the network service providing server 20 and the router 40 is broken (S207). In this case, the determination unit 2011 may determine whether to allow connecting the network service providing server 20 and the router 40 again (S209). For example, if the client 30 inputs the information to start the network service again to the network service providing server 20, it is determined that the connection is allowed (S209; Yes) and the network service providing server 20 is reconnected with the 0 router 40 (S211). This allows the router 40 to receive the provision of the network services again from the network service providing server 20A (S213). If there is no input is from the client 30 for a predetermined period of time, it is determined not to be allowed connecting (S209; No), and the communication management control processing terminates.

By using the present embodiment, period of time-limited network services can be easily performed. In the present embodiment, since the communication setting is time-limited, the load on the router 40 can be reduced.

In the present embodiment, when the predetermined period of time is reached, the determination unit 2011 may terminate the provision of the network service and determine whether to provide the network service again without breaking the connection between the network service providing server 20 and the router 40. In this case, it is not necessary to reconnect, so the provision of the network service can be easily restarted.

In the present embodiment, a communication management system differing from the above embodiments will be described. Specifically, examples including an analysis unit for analyzing the suitability of the setting information will be described.

Figure 15:
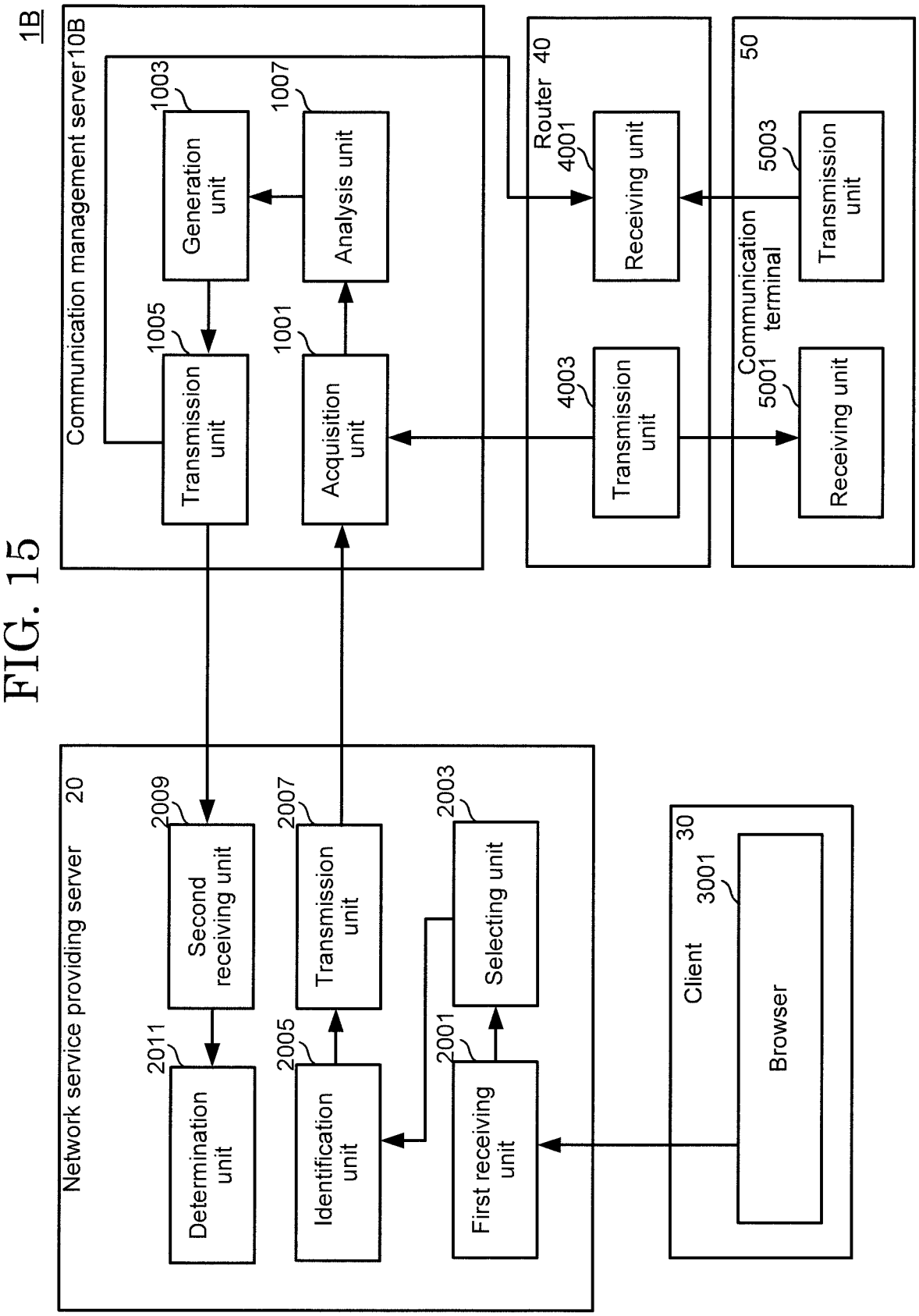
FIG. 15 is a functional block diagram of a communication management system according to an embodiment of the present disclosure.

FIG. 15 is a functional block diagram of a communication management system 1B. As shown in FIG. 15, a communication management server 10B includes an analysis unit 1007 in addition to the acquisition unit 1001, the generation unit 1003, and the transmission unit 1005. The analysis unit 1007 analyzes the suitability of the setting information for the connection between the network service providing server 20 and the router 40.

Figure 16:
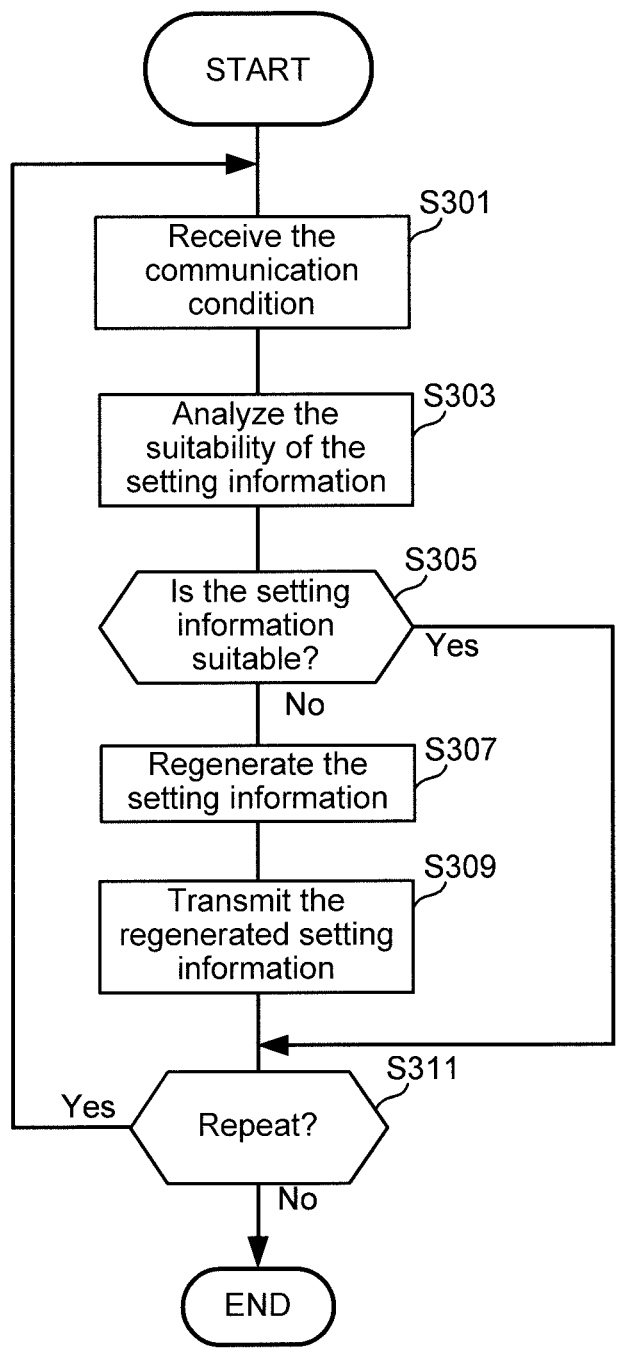
FIG. 16 is a flow diagram showing an example of a process flow performed by a communication management system according to an embodiment of the present disclosure.

FIG. 16 is a flow diagram of the communication management control processing. First, as shown in FIG. 16, the acquisition unit 1001 of the communication management server 10B receives the communication condition of the network service transmitted at predetermined time intervals from the transmission unit 4003 of the router 40 (S301). In this case, the communication condition information includes the amount of communication per predetermined period of time. The analysis unit 1007 analyzes the suitability of the setting information based on the communication condition information (S303). If the setting information is analyzed to be unsuitable (S305; No) (specifically, if the amount of communication per a certain period of time exceeds a predetermined threshold), the generation unit 1003 regenerates the setting information (S307). The regenerated setting information is transmitted to the network service providing server 20 and the router 40 (S309). If the setting information is analyzed to be suitable (S305, Yes), the above process is not performed. When the above process is repeated (S311; Yes), the communication condition is received again (S301).

By using the present embodiment, even when the communication condition largely fluctuates, the setting information can be regenerated based on the analyzed result, and the communication speed can be stabilized.

In the present embodiment, the communication amount per predetermined period of time is exemplified, but not limited thereto. For example, the generation unit 1003 may modify and regenerate the setting information depending on the information of the number and type of the communication terminal 50 connected to the router 40 (also referred to the information related to the communication terminal 50).

In the present embodiment, a communication management system differing from the embodiment above is described. Specifically, an example that includes a relay device which is a communication device different from the router 40, the relay device arranged between the router 40 and the communication terminal 50 is described.

Figure 17:
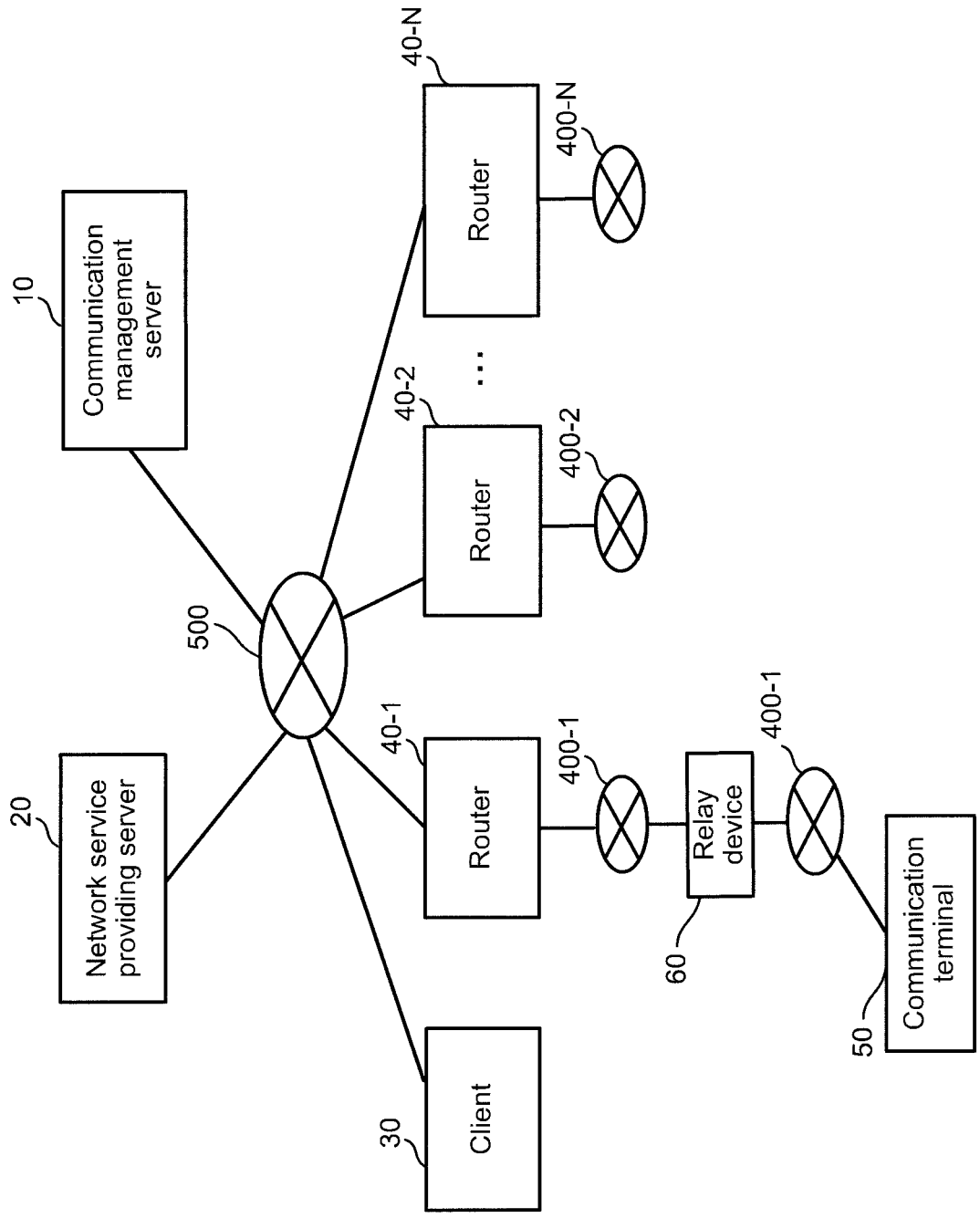
FIG. 17 is a block diagram showing an entire configuration of a communication management system according to an embodiment of the present disclosure.

FIG. 17 is a block diagram showing the entire configuration of a communication management system 1C. As shown in FIG. 17, in the communication management system 1C, a relay device 60 (also referred to a second relay device) may be provided between the router 40 and the communication terminal 50. The relay device 60 may be, for example, a switch (e.g., an L2 switch, an L3 switch, or an application switch) or an access-point. In this case, the communication management server 10 may transmit the setting information to the relay device 60 connected to the router 40. In this case, the relay device 60 can change the bandwidth from 10 Mbps to 100 Mbps or change the setting information of a port. As a result, the communication environment can be stabilized.

Figure 18:
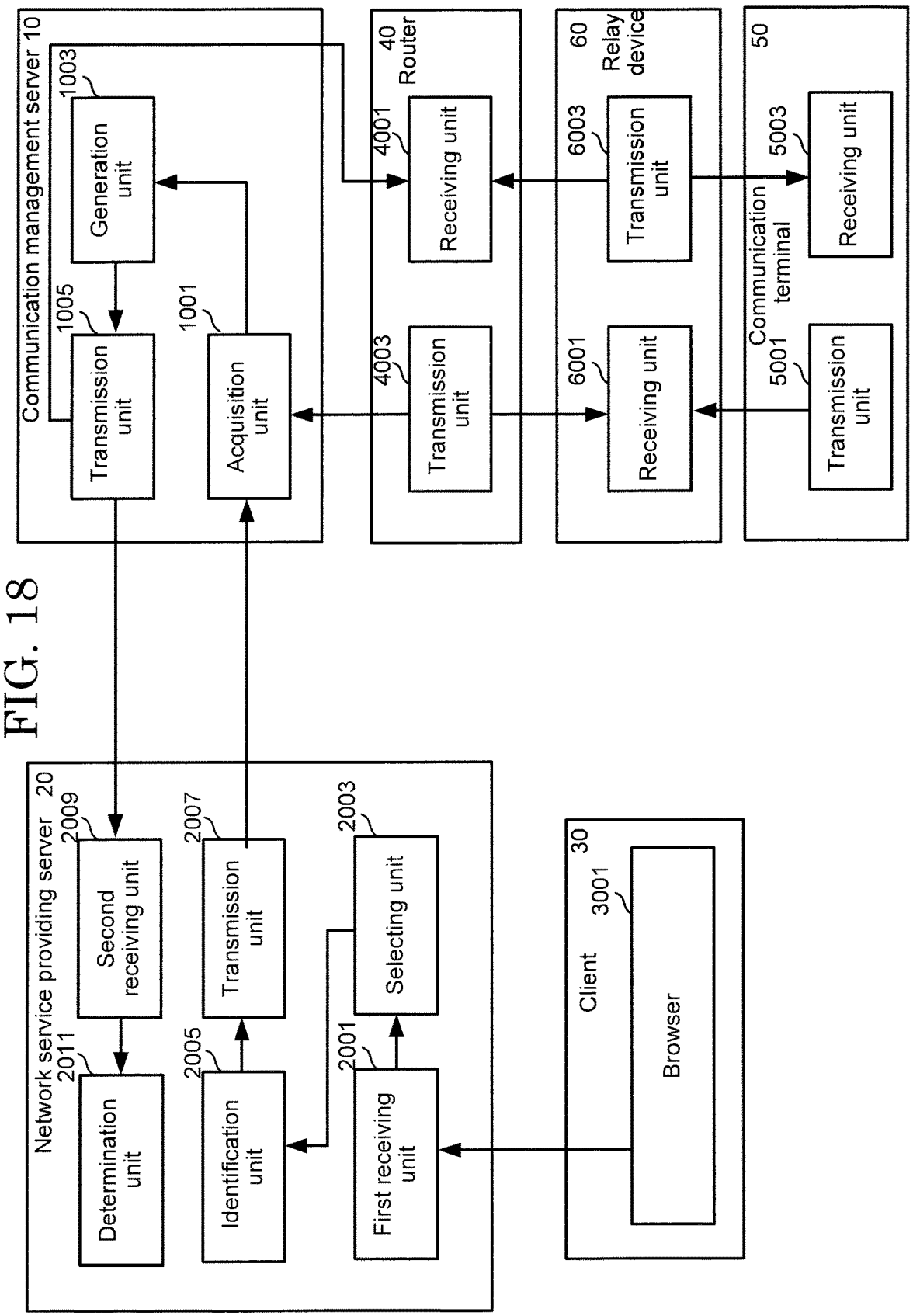
FIG. 18 is a functional block diagram of a communication management system according to an embodiment of the present disclosure.

FIG. 18 is a functional block diagram of a communication management system 1C. As shown in FIG. 18, the relay device 60 has a receiving unit 6001 and a transmission unit 6003. The receiving unit 6001 receives the information of the communication terminal 50 to be connected and receives the setting information transmitted from the router 40. The transmission unit 6003 transmits the information of the connected communication terminal 50 to the router 40 and transmits the setting information to the communication terminal 50. The transmission unit 4003 of the router 40 transmits the information of the router 40, the relay device 60, and the communication terminal 50 to the acquisition unit 1001.

The generation unit 1003 of the communication management server 10 generates setting information between the router 40 and the relay device 60 (also referred to second setting information) and setting information between the relay device 60 and the communication terminal 50 (also referred to third setting information), based on the information of the router 40, the relay device 60 and the communication terminal 50. The information of the router 40, the relay device 60 and the communication terminal 50 is acquired at the acquisition unit 1001. The second setting information and third setting information may include at least one information among bandwidth, QoS (Quality of Service), and communication path, as well as the first setting information. The generation unit 1003 of the communication management server 10 may appropriately generate the setting information between the router 40 and the relay device 60 or the setting information between the relay device 60 and the communication terminal 50 to change the communication environment according to the communication condition.

By using the present embodiment, it is possible to further set an optimal communication environment for the entire communication management system, and to further stabilize the communication environment.

In the present embodiment, the communication management system 1D that differs from the embodiment above will be described. Specifically, an example in which the communication management server 10 includes the network service providing server 20 will be described.

Figure 19:
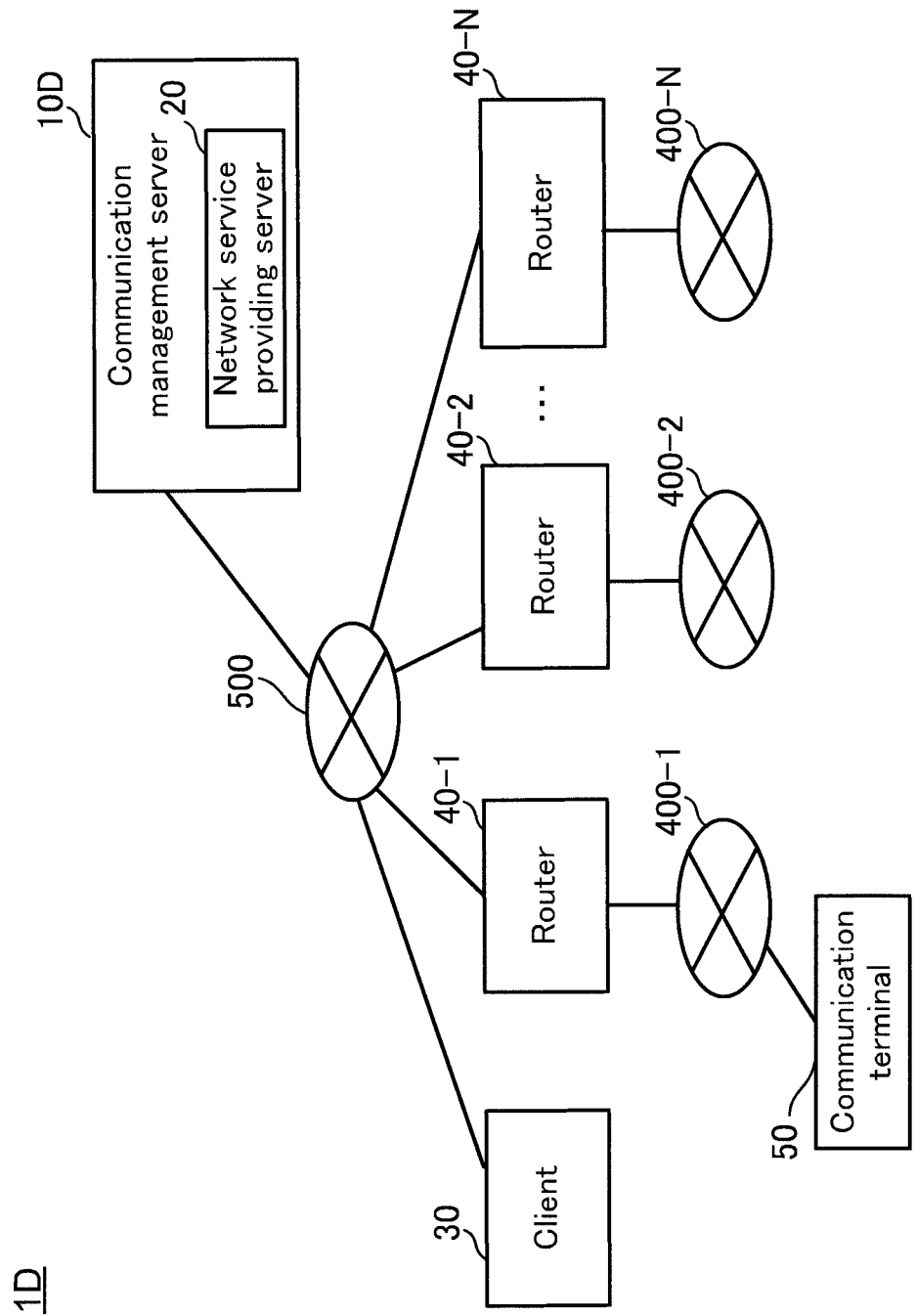
FIG. 19 is a block diagram showing an entire configuration of a communication management system according to an embodiment of the present disclosure.

FIG. 19 is a block diagram showing the entire configuration of the communication management system 1D. As shown in FIG. 19, a communication management server 10D may include the network service providing server 20.

Figure 20:
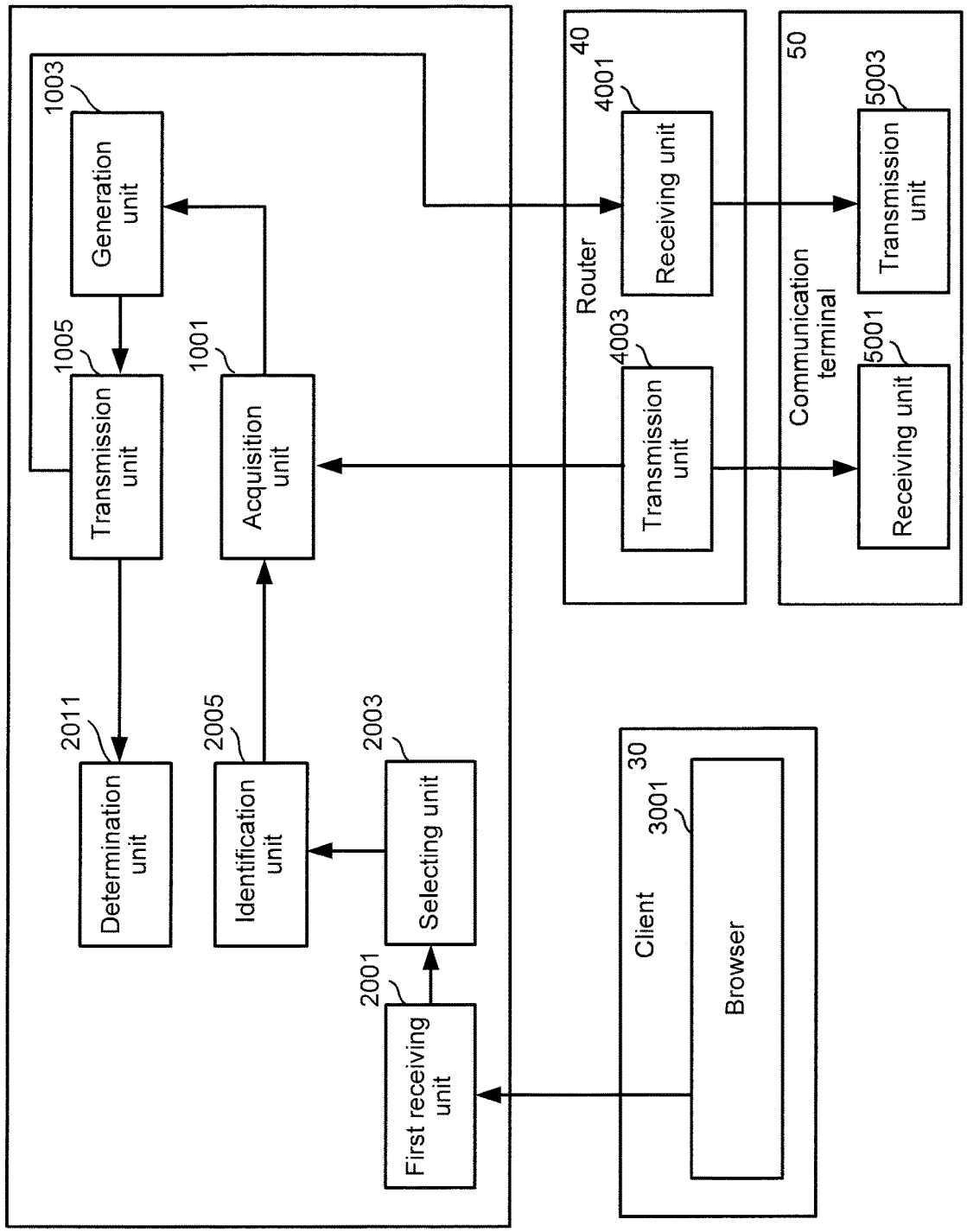
FIG. 20 is a functional block diagram of a communication management system according to an embodiment of the present disclosure.

FIG. 20 is a functional block diagram of the communication management system 1D. As shown in FIG. 20, the communication management server 10 includes the first receiving unit 2001, the selecting unit 2003, the identification unit 2005, and the determination unit 2011 which is the functional unit of the network service providing server 20 in addition to the acquisition unit 1001, the generation unit 1003, and the transmission unit 1005. By using the present embodiment, the communication management system can be simplified, and the setting information can be generated more easily and quickly. Further, by using the present embodiment, it is possible to stabilize the communication environment.

Figure 21:
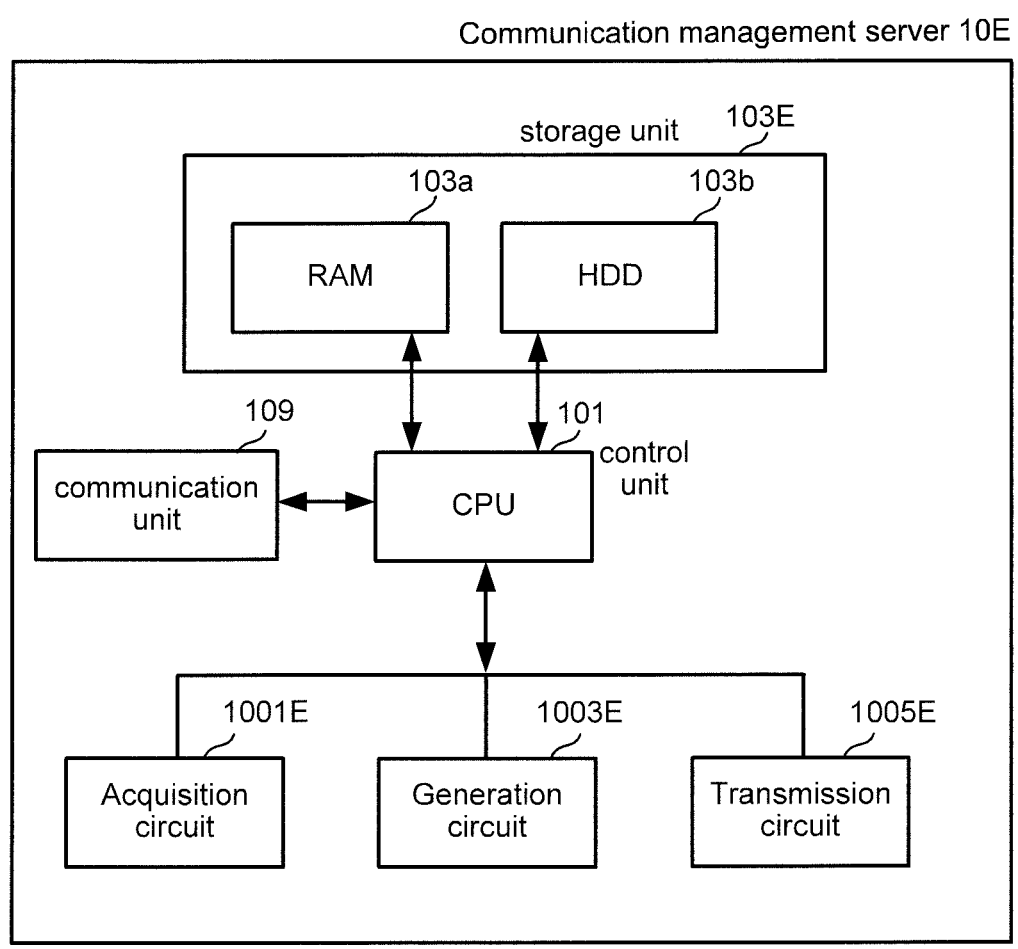
FIG. 21 is a block diagram showing a configuration of a communication management server according to an embodiment of the present disclosure.

The communication management server 10 according to the embodiments of the present disclosure can also be realized by the following hardware configuration or a hardware configuration such as a circuit using FPGA. FIG. 21 is a block diagram showing the configuration of the communication management server 10E. As shown in FIG. 21, the communication management server 10E includes an acquisition circuit 1001E, a generation circuit 1003E, and a transmission circuit 1005E in addition to the CPU as the control unit 101, the RAM (Random Access memory) 103a, the HDD (Hard Disk Drive) 103b as a storage unit 103E, and the communication unit 109.

The control unit 101 of the communication management server 10E is realized by the acquisition circuit 1001E, the generation circuit 1003E, and the transmission circuit 1005E. The acquisition circuit 1001E corresponds to the acquisition unit 1001 of the communication management server 10, the generation circuit 1003E corresponds to the generation unit 1003 of the communication management server 10, and the transmission circuit 1005E corresponds to the transmission unit 1005 of the communication management server 10. Also, in the present embodiment, the same effect as that of the above embodiments of the present disclosure can be obtained.

Figure 22:
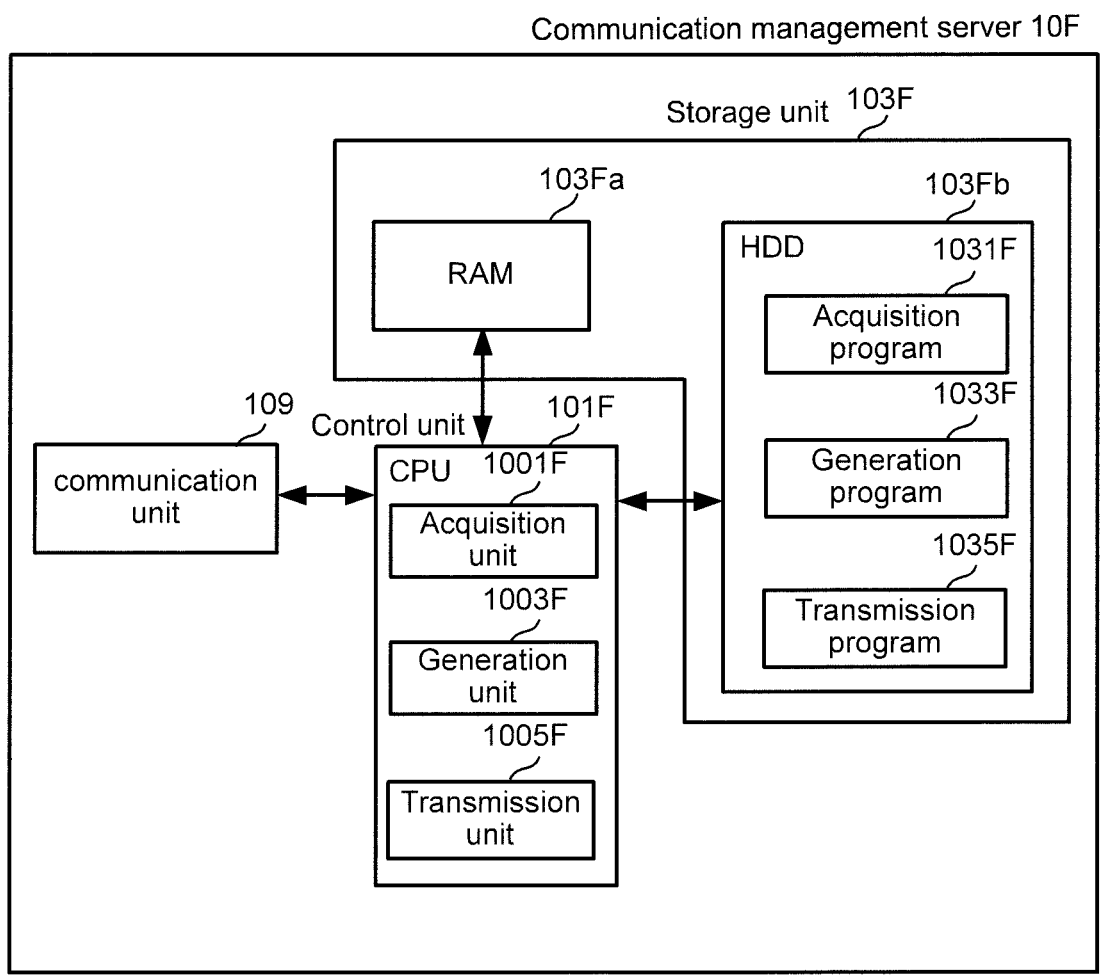
FIG. 22 is a block diagram showing a configuration of a communication management server according to an embodiment of the present disclosure.

The communication management server of the above embodiment can also be realized by the following software configuration. FIG. 22 is a block diagram showing the configuration of a communication management server 10F. As shown in FIG. 22, the communication management server 10F includes a CPU as the control unit 101F, a RAM 103Fa, HDD 103Fb as a storage unit 103F, and the communication unit 109. HDD 103Fa in the storage unit 103F may be replaced with SSD or other storage devices. In the HDD 103Fb, the acquisition program 1031F, the generation program 1033F, and a transmission program 1035F are stored.

An acquisition unit 1001F of the CPU executes the acquisition program 1031F stored in the storage unit 103F to acquire the network service ID 2000a and the administrator ID 2100a, which are transmitted from the network service providing server 20. The acquisition unit 1001F corresponds to the acquisition unit 1001 of the communication management server 10.

A generation unit 1003F of the CPU executes the generation program 1033F stored in the storage unit 103F to generate the setting information for determining the communication condition between the network service providing server 20 and the router 40 corresponding to the administrator. The generation unit 1003F corresponds to the generation unit 1003 of the communication management server 10.

A transmission unit 1005F of the CPU executes the transmission program 1035F stored in the storage unit 103F and transmits the setting information for connecting the network service providing server 20 and the router 40 to both of the network service providing server 20 and the router 40. The transmission unit 1005F corresponds to the transmission unit 1005 of the communication management server 10. According to the present embodiment, the same effect as that of the above embodiment of the present disclosure can be achieved.

<Modifications>

Within the spirit of the present disclosure, it is understood that various changes and modifications can be conceived by those skilled in the art and that these changes and modifications also fall within the scope of the present disclosure. For example, as long as the gist of the present disclosure is provided, the embodiments in which a person skilled in the art adds, deletes, or changes the design components, or adds, omits, or changes the conditions of steps to each of the above-described embodiments are included in the scope of the present disclosure.

In the above embodiment, the client 30 and the router 40 are separated from each other, but the present disclosure is not limited thereto. The client 30 and the router 40 may be connected directly or indirectly.

In the above embodiment of the present disclosure, the router 40 is connected to the network in advance but not limited thereto. If the router 40 corresponding to the administrator is newly connected to the network, the communication management server 10 may regenerate and modify the setting information between the network service providing server 20 and the router 40. This allows the newly connected router 40 to be easily connected to the network service providing server 20. The communication environment between the network service providing server 20 and the router 40 that are already connected to the network service providing server 20 can be maintained.

In the above embodiment of the present disclosure, the example in which the client 30 inputs the information of the network service to be provided to the network service providing server 20 is shown, but not limited thereto. For example, the client 30 may input the network service ID 2000a provided by the network service providing server 20 and the administrator ID 2100a of the administrator who is provided with the networking services via the interface of the communication management server 10. In this case, the interface provided in the communication management server 10 is used. The network service ID 2000a and the administrator ID 2100a are input to the communication management server 10. That is, the acquisition unit 1001 of the communication management server 10 acquires network service ID 2000a and the administrator ID 2100a (1) indirectly by receiving from the network service providing server 20, or (2) directly by being entered into the communication management server 10.

If the network service ID 2000*a* and the administrator ID 2100*a* are stored in the storage unit 103, the acquisition unit 1001 of the communication management server 10 may acquire the network service ID 2000*a* and the administrator ID 2100*a* from the storage unit 103.

The network service ID 2000*a* and the administrator ID 2100*a* may be stored in a device different from the router 40. For example, in addition to the network service providing server 20 described above, as least one of a server which has a storage unit different from the network service providing server 20, or an external storage device connected to the communication management server, such as HDD, SSD, and the like may store the network service ID 2000*a* and the administrator ID 2100*a*.

The acquisition unit 1001 of the communication management server 10 may spontaneously acquire the network service ID 2000*a* and the administrator ID 2100*a* from the network service providing server 20 or other devices.

In the above embodiment of the present disclosure, the communication management control program is stored in the storage unit of each device, but the present disclosure is not limited thereto. The communication management control program may be distributed via network.

In the above embodiment of the present disclosure, the example in which the preset information for generating the setting information is provided in the communication management server 10 is described, but the present disclosure is not limited thereto. In the case in which there is no preset information, when the network service providing server 20 transmits the network service information, information related to the setting information (e.g., bandwidth information) may be transmitted.

In the above embodiment of the present disclosure, the network service providing server 20 and the router 40 are connected to each other, but not limited thereto. For example, a network service providing device may be connected to the network service providing server 20. In this case, the network service providing device may be connected to the router 40. In this case, the network service providing server 20 may be a portal site.

Unlike the above, the client 30 may input the information of the network service to be provided to a portal site different from the network service providing server 20 or the communication management server 10. The network service ID 2000*a* and the administrator ID 2100*a* may be transmitted from the portal site to the communication management server 10.

In the above embodiment of the present disclosure, the setting information is set according to the router and the network service contents 2000*b*, but the present disclosure not limited thereto. For example, the setting information may be generated depending on the administrator ID and contents of the network service. Specifically, the information that expands the bandwidth during video distribution may be generated depending on the amount of network service usage paid from the administrator to the network service management server.

In the above embodiment of the present disclosure, the communication management server 10 transmits the setting information to the relay device 60 connected to the router 40, but not limited thereto. For example, the communication management server 10 may transmit information to change the setting of the relay device 60 to the router 40. In this case, the relay device 60 can directly receive the instruction to change the setting information from the router 40.

In the above embodiment of the present disclosure, a personal computer is shown as the communication terminal 50, but not limited thereto, and other devices may be used. For example, an audio device (specifically, a mixer, an equalizer, an amplifier, a microphone, or the like) or a video device (specifically, a video camera, or the like) may be used as the communication terminal 50. In this case, the audio device can be used as the communication device to be controlled. For example, the equalizer can be set by the communication management server 10. In this case, the router 40 may not necessarily be used. Therefore, the communication management server 10 can directly set the communication terminal 50.

In the above embodiment of the present disclosure, the router 40 is used as the communication device, but not limited thereto. A gateway may be used as a specific example of the communication device. For example, if a VoIP gateway is used as an exemplary gateway, the VoIP gateway can convert voice signals and IP packets between the analog telephone and the IP network as the communication terminal 50.

Although not shown in the above embodiment of the present disclosure, the communication management server 10 may be connected to the network service providing server 20 via an API (Application Programming Interface). For example, a web API can be used as the API. Connecting via the API can make the setting information in the communication management server 10 to be generated more quickly and easily.

In the communication management server of an embodiment of the present disclosure, the second identification information may be acquired from a device different from the above communication device.

In the communication management server of an embodiment of the present disclosure, the second identification information may be the identifier common to the at least one communication device.

In the communication management server of an embodiment of the present disclosure, the generation unit may change the first setting information based on the communication condition between the communication device and the network service providing server.

In the communication management server of an embodiment of the present disclosure, the communication device may have a first interface connected to the network service providing server via a first network and a second interface connected to a second network different from the first network. The communication device may be a first relay device that relays the first network to the second network. The communication device may be connected to the communication terminal.

In the communication management server of an embodiment of the present disclosure, the generation unit may change the first setting information according to the information related to the communication terminal.

In the communication management server of an embodiment of the present disclosure, the communication device may be connected to the communication terminal via a second relay device.

In the communication management server of an embodiment of the present disclosure, the generation unit may generate at least one second setting information. The second setting information may be information to connect between the at least one communication device and the second relay device. The third setting information may be information to connect between the second relay device and the communication terminal.

In the communication management server of an embodiment of the present disclosure, at least one of the first setting information, the second setting information, and the third setting information may include at least one information of bandwidth, QOS (Quality of Service), and communication path.

In the communication management server of an embodiment of the present disclosure, the communication terminal may be an audio device.

The communication management server of an embodiment of the present disclosure may be connected to the network service providing server via API.

In the communication management server of an embodiment of the present disclosure, the at least one communication device may make a VPN connection with the network service providing server.

According to an embodiment of the present disclosure, a communication management system including the communication management server and a network providing server configured to provide the network service. The network service providing server includes a selecting unit configured to select a provided network service, an identification unit configured to identify the second identification information corresponding to an administrator who inputs the selection signal into the selecting unit, a second transmission unit configured to transmit the first identification information indicating the selected network service and the second identification information, and a receiving unit for receiving the first setting information. The network service providing server determines whether to allow connecting to the at least one communication device based on the first setting information, and provides the network service to the at least one communication device when it is determined to allow connecting.

In the above communication management system, the network service providing server may include the measurement unit configured to measure a period of time of providing the selected network service.

According to an embodiment of the present disclosure, there is provided a communication management method for acquiring the first identification information indicating a network service and the second identification information managing the at least one communication device receiving the network service, generating first setting information for connecting the network service providing server corresponding to the network service and the at least one communication device based on the first identification information and the second identification information, and transmitting the generated first setting information to the at least one communication device.

In the communication management method, the communication management method may include receiving the selection signal for selecting the network service, identifying a second identification information corresponding to an administrator who inputs the selection signal, and generating the first setting information for connecting a network service providing server corresponding to the network service and the at least one communication device based on the first identification information and the second identification information.

In the communication management method, the communication management method may include determine whether to allow connecting to the at least one communication device and the network service providing server based on the first setting information. The communication management method may include providing the network service to the at least one communication device when it is determined to allow connecting to the at least one communication device and the network service providing server.

In the communication management method, the second identification information may be the identifier common to the at least one communication device.

In the communication management method, the first setting information may be changed based on the communication condition between the at least one communication device and the network service providing server.

In the communication management method, the at least one communication device may have first interface connected to the network service providing server via first network and second interface connected to the second network differing from the first network. The at least one communication device may be first relay device for relaying the first network and the second network. The at least one communication device may be connected to the communication terminal.

In the communication management method, the first setting information may be changed according to the information related to the communication terminal.

In the communication management method, the at least one communication device may be connected to the communication terminal via second relay device.

In the communication management method, the at least one one second setting information between the at least one communication device and the second relay device and the third setting information between the second relay device and communication terminal may be generated according to the communication condition.

In the communication management method, at least one of the first setting information, the second setting information, and the third setting information may include at least one information of bandwidth, QOS (Quality of Service), and communication path.

In the above communication management method, the communication terminal may be an audio device.

In the communication management method, the at least one communication device may be made the VPN connection with the network service providing server.

In the communication management method, a period of time for providing the network service may be measured.

The present disclosure can also be grasped as an disclosure of a method, i.e., a communication method, a relay method, and an information processing method.

What is claimed is:

1. A communication management server comprising:
 a processor; and
 a memory configured to store a program, the program executed by the processor to cause the processor to:
  acquire first identification information configured to indicate a network service and second identification information configured to manage a router receiving the network service;
  store preset information according to the type of router and content of the network service, the preset information being configuration data for communication including information related to at least one of bandwidth, QoS (Quality of Service), and a communication path;
  generate first setting information configured to connect a network service providing server corresponding to the network service and the router based on the first identification information, the second identification information, and the preset information, the first setting information including information related to at least one of bandwidth, QoS (Quality of Service), and a communication path; and transmit the first setting information to the router measure a period of time of a communication connection between the network service providing server and the router; and determine whether to allow a connection between the network service providing server and the router again while maintaining the first setting information, when the period of time of the communication connection reaches a predetermined period of time and the connection between the network service providing server and the router is broken.

2. The communication management server according to claim 1, wherein the program causes the processor to acquire the second identification information from a device different from the plurality of routers.

3. The communication management server according to claim 1, wherein the router includes a first interface connected to the network service providing server via a first network and a second interface connected to a second network different from the first network;

the router is a first relay device relaying the first network and the second network, and the router is connected to a communication terminal.

4. The communication management server according to claim 3, wherein the program causes the processor to change the first setting information depending on information related to the communication terminal.

5. The communication management server according to claim 4, wherein the router is connected to the communication terminal via a second relay device.

6. The communication management server according to claim 5, wherein the program causes the processor to generate at least one of second setting information and third setting information depending on the communication condition, the second setting information is information to connect the router and the second relay device, and the third setting information is information to connect the second relay device and the communication terminal.

7. The communication management server according to claim 6, wherein the second setting information and the third setting information include information related to at least one of bandwidth, QoS (Quality of Service), and communication path.

8. The communication management server according to claim 3, wherein the communication terminal is an audio device.

9. The communication management server according to claim 1, wherein the communication management server is connected to the network service providing server via an API (Application Programming Interface).

10. The communication management server according to claim 1, wherein the at least one communication device makes a VPN (Virtual Private Network) connection with the network service providing server.

11. A communication management system comprising:

the communication management server according to claim 1; and a network service providing server configured to provide the network service, wherein the network service providing server comprises;

a processor; and a memory device configured to store a program, the program executed by the processor to cause the processor to:

select a network service provided to the router;

identify the second identification information corresponding to a manager who inputs a selection signal to select the network service;

transmit the first identification information showing the selected network service and the second identification information;

receive the first setting information;

determine whether to allow a connection to the router based on the first setting information; and provide the network service to the router when it is determined to allow the connection.

12. The communication management system according to claim 11, wherein the program causes the processor to measure a period of time to provide the selected network service.

13. A communication management method comprising:

acquiring first identification information showing a network service and second identification information configured to manage a router receiving the network service;

storing preset information according to the type of router and content of the network service, the preset information being configuration data for communication including information related to at least one of bandwidth, QoS (Quality of Service), and a communication path;

generating a first setting information based on the first identification information and the second identification information, and the preset information, the first setting information being information configured to connect a network providing server corresponding to the network service and the router, and the first setting information including information related to_at least one of bandwidth, QoS (Quality of Service), and a communication path;

transmitting the generated first setting information to the router;

measuring a period of time of a communication connection between the network service providing server and the router; and determining whether to allow a connection between the network service providing server and the router again while maintaining the first setting information, when the period of time of communication connection reaches a predetermined period of time and the connection between the network service providing server and the router is broken.

14. The communication management method according to claim 13, further comprising:

receiving a selection signal configured to select the network service;

identifying the second identification information corresponding to a manager who inputs the selection signal; and generating the first setting information based on the first identification information and the second identification information.

15. The communication management method according to claim 13, further comprising:

determining whether to allow a connection to the router based on the first setting information; and providing the network service to the router when it is determined to allow the connection.

16. The communication management method according to claim 13, wherein the second identification information is an identifier common to the router.

17. The communication management method according to claim 13,
- wherein the router includes a first interface connected to the network service providing server via a first network, and a second interface connected to a second network different from the first network;
- the router is a first relay device connecting the first network and the second network; and
- the router is connected to a communication terminal.

\* \* \* \* \*